(12) United States Patent
Liu et al.

(10) Patent No.: US 10,848,306 B2
(45) Date of Patent: Nov. 24, 2020

(54) METHOD AND SYSTEM OF IMPLEMENTING SECURITY ALGORITHM AND DECRYPTION ALGORITHM BY USING RECONFIGURABLE PROCESSOR

(71) Applicant: Wuxi Research Institute of Applied Technologies Tsinghua University, Jiangsu (CN)

(72) Inventors: Leibo Liu, Jiangsu (CN); Min Zhu, Jiangsu (CN); Shaojun Wei, Jiangsu (CN)

(73) Assignee: Wuxi Research Institute of Applied Technologies Tsinghua University, Jiangsu (CN)

( * ) Notice: Subject to any disclaimer, the term of this patent is extended or adjusted under 35 U.S.C. 154(b) by 0 days.

(21) Appl. No.: 16/270,521

(22) Filed: Feb. 7, 2019

(65) Prior Publication Data
US 2019/0327089 A1    Oct. 24, 2019

(30) Foreign Application Priority Data
Apr. 19, 2018    (CN) .......................... 2018 1 0364457

(51) Int. Cl.
*H04L 9/14*    (2006.01)
*H04L 9/00*    (2006.01)

(52) U.S. Cl.
CPC ............... *H04L 9/14* (2013.01); *H04L 9/003* (2013.01)

(58) Field of Classification Search
CPC .................................. H04L 9/14; H04L 9/003
See application file for complete search history.

(56) References Cited

U.S. PATENT DOCUMENTS 8,181,035 B1 *   5/2012  Fernandez Gutierrez ................... H04L 9/14 713/176
9,558,228 B2 *   1/2017  Spalka ................ G06F 21/6218
(Continued)

FOREIGN PATENT DOCUMENTS

CN    102509036 A    6/2012
CN    105677582 A    6/2016
(Continued)

OTHER PUBLICATIONS

Chinese Patent Application No. 201810364457.9, First Office Action with translation, dated Apr. 9, 2019, 19 pages.
(Continued)

*Primary Examiner* — Ali S Abyaneh
*Assistant Examiner* — Zoha Piyadehghibi Tafaghodi
(74) *Attorney, Agent, or Firm* — Fish & Richardson P.C.

(57) ABSTRACT

The present disclosure provides a system and method of implementing a security algorithm using a reconfigurable processor, the method including: determining a plurality of sub-algorithms for constructing the security algorithm; and configuring the reconfigurable processor to implement the security algorithm according to a first configuration information of each sub-algorithm of the plurality of sub-algorithms and a first combination configuration information indicating a combination connection relationship of each of the sub-algorithms. The present disclosure also provides a system and method of implementing a decryption algorithm using a reconfigurable processor. Configuration of the reconfigurable processor according to the present disclosure can enable the security of the security algorithm and the security of the security algorithm implementation process to be ensured, the security risks of the sensitive data management
(Continued)

and the risk of side channel attacks can be prevented, and the security is extremely high.

10 Claims, 11 Drawing Sheets

(56) References Cited

U.S. PATENT DOCUMENTS

| | | | | |
|---|---|---|---|---|
| 10,002,152 | B2* | 6/2018 | Spalka | G06F 21/6218 |
| 2008/0097954 | A1* | 4/2008 | Dutta | G06F 21/6227 |
| 2010/0278338 | A1 | 11/2010 | Chang et al. | |
| 2010/0306221 | A1* | 12/2010 | Lokam | G06F 17/30631 |
| | | | | 707/759 |
| 2011/0129089 | A1* | 6/2011 | Kim | G06F 21/6227 |
| | | | | 380/284 |
| 2015/0379301 | A1* | 12/2015 | Lesavich | G06F 16/182 |
| | | | | 726/28 |
| 2017/0039386 | A1* | 2/2017 | Lehnhardt | G06F 21/6227 |

FOREIGN PATENT DOCUMENTS

| | | |
|---|---|---|
| CN | 105912501 A | 8/2016 |
| CN | 105912501 B | 6/2018 |

OTHER PUBLICATIONS

Chinese Patent Application No. 201810364457.9, Notice on Granting the Patent Right for Invention with translation, dated Jun. 20, 2019, 3 pages.

Chinese Patent Application No. 201810364457.9, Notification of Corrections on the Notification to Grant the Patent Right for Invention with translation, dated Jul. 15, 2019, 4 pages.

Chinese Patent Application No. 201810364457.9, First Office Action with translation, dated Apr. 9, 2019, 21 pages.

* cited by examiner

METHOD AND SYSTEM OF IMPLEMENTING SECURITY ALGORITHM AND DECRYPTION ALGORITHM BY USING RECONFIGURABLE PROCESSOR

CROSS-REFERENCE TO RELATED APPLICATION(S)

This application claims priority to a Chinese Patent Application No. 201810364457.9, filed with the Chinese Patent Office on Apr. 19, 2018 and entitled "METHOD AND SYSTEM OF IMPLEMENTING SECURITY ALGORITHM AND DECRYPTION ALGORITHM BY USING RECONFIGURABLE PROCESSOR", which is incorporated herein by reference entirely.

TECHNICAL FIELD

The present disclosure relates to a method and system of implementing a security algorithm using a reconfigurable processor, a method and system of implementing a decryption algorithm using a reconfigurable processor, a computer system, and a computer readable storage medium.

BACKGROUND

With the popularization and development of network technology, the degree of informationization of society is increasing, and the importance of information security has gradually emerged. Security algorithms, especially encryption algorithms, are one of the most commonly used techniques in the process of ensuring information security. At present, in the security algorithms, commonly used encryption algorithms may be divided into two categories, one is a symmetric encryption algorithm, and the other is an asymmetric encryption algorithm.

However, in the process of implementing the concept of the present disclosure, the inventors have found that at least the following problems exist in the prior art: on the one hand, the security of the above encryption algorithms is not high, and on the other hand, the defense of attack and peeping when implementing the above encryption algorithms requires high management cost.

SUMMARY

An aspect of the present disclosure provides a method of implementing a security algorithm using a reconfigurable processor, comprising: determining a plurality of sub-algorithms for constructing the security algorithm; and configuring the reconfigurable processor to implement the security algorithm according to a first configuration information of each sub-algorithm of the plurality of sub-algorithms and a first combination configuration information indicating a combination connection relationship of each of the sub-algorithms.

Another aspect of the present disclosure provides a method of implementing a decryption algorithm using a reconfigurable processor, comprising: determining a plurality of decryption sub-algorithms for decrypting a security algorithm; and configuring the reconfigurable processor to implement the decryption algorithm according to a second configuration information of each of the plurality of decryption sub-algorithms and a second combination configuration information indicating a combination connection relationship of each of the decryption sub-algorithms.

Another aspect of the present disclosure provides a system of implementing a security algorithm using a reconfigurable processor, comprising: a first determining module configured to determine a plurality of sub-algorithms for constructing the security algorithm; and a first configuring module configured to configure the reconfigurable processor to implement the security algorithm according to a first configuration information of each of the sub-algorithm of the plurality of sub-algorithms and a first combination configuration information indicating a combination connection relationship of each of the sub-algorithms.

Another aspect of the present disclosure provides a system of implementing a decryption algorithm using a reconfigurable processor, comprising: a second determining module configured to determine a plurality of decryption sub-algorithms for decrypting a security algorithm; and a second configuring module configured to configure the reconfigurable processor to implement the decryption algorithm according to a second configuration information of each of the plurality of decryption sub-algorithms and a second combination configuration information indicating a combination connection relationship of each decryption sub-algorithms.

Another aspect of the present disclosure provides a computer system comprising: one or more processors; and a computer readable storage medium for storing one or more programs, wherein, the one or more programs, when executed by the one or more processors, cause the one or more processors to implement the method of implementing the security algorithm using the reconfigurable processor as described by any of the above embodiments, and/or implement the method of implementing the decryption algorithm using the reconfigurable processor as described by any of the above embodiments.

Another aspect of the present disclosure provides a computer readable storage medium having executable instructions stored thereon that, when executed by a processor, cause the processor to implement the method of implementing a security algorithm using a reconfigurable processor as described by any of the above embodiments, and/or implement the method of implementing a decryption algorithm using a reconfigurable processor as described by any of the above embodiments.

According to the solution of the embodiment of the present disclosure, the reconfigurable processor is configured according to a first configuration information of each sub-algorithm of the plurality of sub-algorithms and a first combination configuration information indicating a combination connection relationship of each sub-algorithms, therefore, the security of the security algorithm and the security of the security algorithm implementation process can be ensured, the security risks of the sensitive data management and the risk of the side channel attacks can be prevented, and the security is extremely high.

According to the solution of the embodiment of the present disclosure, the reconfigurable processor is configured according to a second configuration information of each of the plurality of decryption sub-algorithms and a second combination configuration information indicating a combination connection relationship of each decryption sub-algorithms, therefore, the security of the decryption algorithm and the security of the decryption process of the security algorithm can be ensured, and the security risks of the sensitive data management and the risk of the side channel attacks can be prevented.

BRIEF DESCRIPTION OF THE DRAWINGS

For a more complete understanding of the present disclosure and its advantages, reference is now made to the following descriptions in connection with the accompanying drawings, in which.

DETAILED DESCRIPTION

Figure 1:
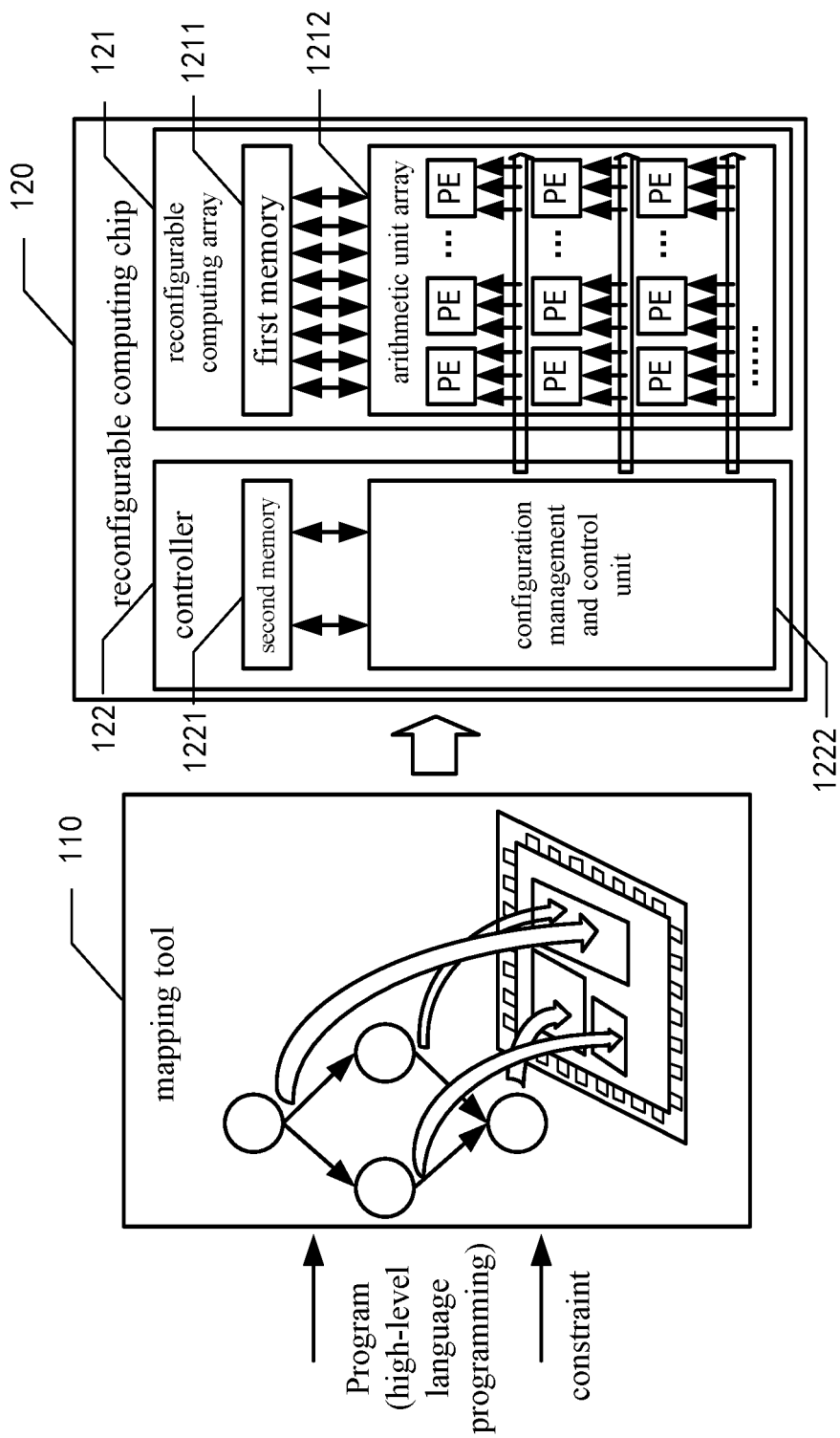
FIG. 1 is a schematic diagram showing an application scenario of a method and system for implementing a security algorithm using a reconfigurable processor according to an embodiment of the present disclosure.

Hereinafter, embodiments of the present disclosure will be described with reference to the accompanying drawings. It should be understood, however, that these descriptions are merely exemplary and are not intended to limit the scope of the present disclosure. In addition, in the following description, descriptions of well-known structures and techniques are omitted to avoid unnecessarily obscuring the concepts of the present disclosure.

The terminology used herein is for the purpose of describing particular embodiments only and is not intended to limit the present disclosure. The terms "include", "comprise", etc., as used herein indicate the presence of stated features, steps, operations, and/or components, but do not preclude the presence or addition of one or more other features, steps, operations, or components.

All terms (including technical and scientific terms) used herein have the meaning as commonly understood by one of ordinary skill in the art, unless otherwise defined. It should be noted that terms used herein should be interpreted as having a meaning that is consistent with the context of the present description and should not be interpreted in an idealized or overly stereotypical manner.

In the case of a statement similar to "at least one of A, B, and C, etc.," it should be generally interpreted in the light of the ordinary understanding of the expression by a person skilled in the art (for example, "a system having at least one of A, B, and C" shall include, but is not limited to, systems with A alone, B alone, C alone, A and B, A and C, B and C, and/or A, B, and C, etc.). In the case of a statement similar to "at least one of A, B, or C, etc.," it should be generally interpreted in the light of the ordinary understanding of the expression by a person skilled in the art (for example, "a system having at least one of A, B, or C" shall include, but is not limited to, systems with A alone, B alone, C alone, A and B, A and C, B and C, and/or A, B, and C, etc.). It should also be understood by those skilled in the art that virtually any transitional conjunctions and/or phrases representing two or more alternative items, whether in the description, the claims or the drawings, should be understood as providing the possibilities of including one of these items, either of these items or both of these items. For example, the phrase "A or B" should be understood to include the possibilities of "A" or "B" or "A and B."

Several block diagrams and/or flow charts are shown in the drawings. It should be understood that some of the blocks or combinations thereof in the block diagrams and/or flow charts may be implemented by computer program instructions. Such computer program instructions may be provided to a processor of a general purpose computer, a special purpose computer, or other programmable data processing apparatus such that the instructions, when executed by the processor, may create means for implementing the functions/operations illustrated in these block diagrams and/or flow charts.

Accordingly, the techniques of the present disclosure may be implemented in the form of hardware and/or software (including firmware, microcode, etc.). Additionally, the techniques of the present disclosure may take the form of a computer program product on a computer readable medium having stored thereon instructions for use by or in connection with an instruction execution system. In the context of the present disclosure, a computer readable medium may be any medium that can contain, store, communicate, propagate, or transport the instructions. For example, computer readable medium may include but are not limited to electrical, magnetic, optical, electromagnetic, infrared, or semiconductor systems, apparatus, devices, or propagation medium. Specific examples of computer readable medium include a magnetic storage device such as a magnetic tape or a hard disk (HDD), an optical storage device such as a compact disc (CD-ROM), a memory such as a random access memory (RAM) or a flash memory, and/or wired/wireless communication link.

The present disclosure provides a method of implementing a security algorithm using a reconfigurable processor, comprising: determining a plurality of sub-algorithms for constructing the security algorithm; and configuring the reconfigurable processor to implement the security algorithm according to a first configuration information of each sub-algorithm of the plurality of sub-algorithms and a first combination configuration information indicating a combination connection relationship of each sub-algorithms.

FIG. 1 is a schematic diagram showing an application scenario of a method and system for implementing a security algorithm using a reconfigurable processor according to an embodiment of the present disclosure. It should be noted that FIG. 1 is only one example of the scenario in which the embodiment of the present disclosure may be applied, to help those skilled in the art understand the technical content of the present disclosure, and does not mean that the embodiment of the present disclosure may not be used for other devices, systems, environments or scenario.

As shown in FIG. 1, the application scenario includes a mapping tool 110, and a reconfigurable computing chip (also referred to as a reconfigurable processor) 120. The reconfigurable computing chip 120 may include a reconfigurable computing array 121 and a controller 122. The reconfigurable computing array 121 may include a first memory 1211 and an arithmetic unit array 1212. The controller 122 may include a second memory 1221, and a configuration management and control unit 1222.

In an embodiment of the present disclosure, the mapping tool 110 may map a high level language program to configuration information of the reconfigurable processor. In this way, it is possible to write a program to configure the reconfigurable processor to implement different computing functions.

Alternatively, the program may be loaded into the reconfigurable computing chip 120. The reconfigurable computing chip 120 may appear in the form of an array, such as a reconfigurable computing array 121. The reconfigurable computing array 121 will be described in detail below as an example.

According to an embodiment of the present disclosure, the arithmetic unit array 1212 in the reconfigurable computing array 121 may be composed of a large number of processing elements (PE), and there are flexible interconnect structures between the processing elements. When the arithmetic task is performed, the arithmetic unit array 1212 may store information such as an intermediate result in the first memory 1211.

It should be noted that the reconfigurable computing array 121 or the sub-arrays therein may have a timing control module and multiple sets of different data input and output interfaces.

According to an embodiment of the present disclosure, under the control of the controller 122, the reconfigurable computing array 121 may implement time division multiplexing of computing resources by dynamic reconfiguration. Since the amount of configuration information of the security algorithm and the security application is small (for example, the size does not exceed 10 kbytes), the reconfigurable computing array 121 may complete function switching at the nanosecond (ns) or microsecond (us) level. In addition, local function switching may also be implemented by changing the configuration information of the local configuration points in the reconfigurable computing array 121. The above configuration information may be stored in the second memory 1221.

In an embodiment of the present disclosure, the configuration information storage structure (also referred to as configuration management and control unit 1222) has a path associated with a random number generating device (also referred to as a random number generator), and the random number generating device may generate a random part of configuration information, this part of the configuration information may change the computing results or computing functions, but does not affect the main form of computing (for example, encryption form, check form, etc.).

It should be noted that, in a specific implementation, the first memory 1211 and the second memory 1221 may be implemented as the same memory, or the first memory 1211 and the second memory 1221 may be implemented as different memories of the same type or different types, and the embodiment of the present disclosure does not limit this.

Figure 2A:
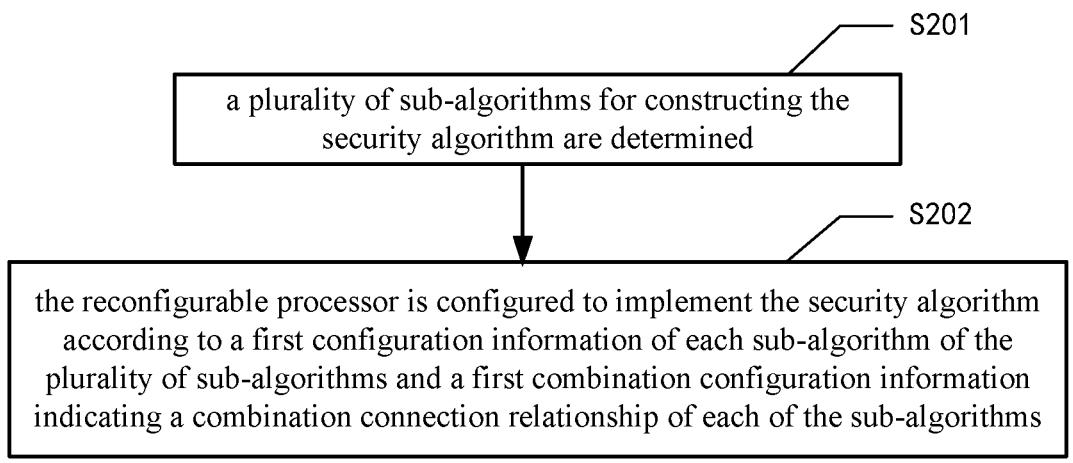
FIG. 2A schematically illustrates a flow chart for a method of implementing a security algorithm using a reconfigurable processor, in accordance with an embodiment of the present disclosure.

FIG. 2A is a flow chart that schematically illustrates a method of implementing a security algorithm using a reconfigurable processor, in accordance with an embodiment of the present disclosure. As shown in FIG. 2A, the method of implementing a security algorithm using a reconfigurable processor may include an operation S201 and an operation S202.

In operation S201, a plurality of sub-algorithms for constructing the security algorithm are determined.

In operation S202, the reconfigurable processor is configured to implement the security algorithm according to a first configuration information of each sub-algorithm of the plurality of sub-algorithms and a first combination configuration information indicating a combination connection relationship of each sub-algorithms.

It should be noted that the security algorithm in the embodiment of the present disclosure may include not only an encryption algorithm, but also other algorithms such as a digital digest algorithm, a digital signature algorithm, and an information encoding algorithm.

A plurality of sub-algorithms are stored in the first algorithm library provided by the embodiment of the present disclosure. Each sub-algorithm has configuration information corresponding thereto (referred to as the first configuration information), and the first configuration information may indicate the circuit logic structure required for implementing the sub-algorithm. In this way, when determining a plurality of sub-algorithms for constructing the security algorithm, the sub-algorithms that need to be used this time may be selected from the first algorithm library, and then the reconfigurable processor may be configured according to the configuration information of the selected sub-algorithms.

In addition, in the embodiment of the present disclosure, combination configuration information (also referred to as first combination configuration information) may be used to implement a combination connection of each sub-algorithms. For example, assuming that the combination connection relationship of the sub-algorithm a, the sub-algorithm b, and the sub-algorithm c is a-b-c (i.e., the sub-algorithm a is connected to the sub-algorithm b, and the sub-algorithm b is connected to the sub-algorithm c), the first combination configuration information may be generated according to the above combination connection relationship, or a pre-generated first combination configuration information indicating the above combination connection relationship may be obtained. In this way, when the reconfigurable processor is used to implement the security algorithm, the reconfigurable processor may be configured according to the first combination configuration information to implement the foregoing connection relationship.

Figure 2B:
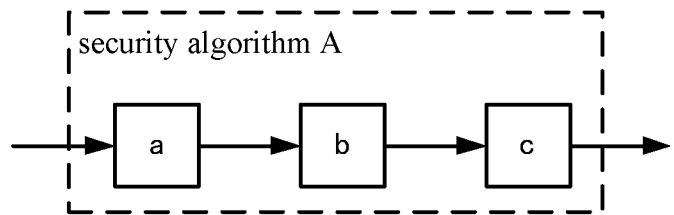
FIG. 2B is a diagram schematically showing the construction of the security algorithm A in accordance with an embodiment of the present disclosure.

FIG. 2B is a diagram schematically showing the construction of the security algorithm A in accordance with an embodiment of the present disclosure.

As shown in FIG. 2B, in combination with the above example, when the user implements the security algorithm A using the reconfigurable processor, the plurality of sub-algorithms used to construct the security algorithm A and the connection relationship between the sub-algorithms may be determined first. For example, suppose the sub-algorithm a, the sub-algorithm b, and the sub-algorithm c are selected to construct the security algorithm A, and the connection relationship is a-b-c. Then, the reconfigurable processor is configured to implement the security algorithm A according to the first configuration information a of the sub-algorithm a, the first configuration information b of the sub-algorithm b, the first configuration information c of the sub-algorithm c, and the first combination configuration information Al (for implementing the above combination connection relationship a-b-c).

Security algorithms, especially encryption algorithms, are one of the most commonly used techniques in the process of ensuring information security. However, any security product or cryptographic system must face a problem of how to defend against attacks and peeks. For example, in a scenario where a symmetric encryption algorithm is used, in order to prevent an attacker from breaking the key, it is necessary to continuously change the key to increase the security strength of the encryption machine, thereby causing the key management cost to increase. In addition, security threats such as side channel attacks can also exploit the side channel information leaked by the cipher chip during operation, such as power consumption, time, electromagnetic waves, and error information, to attack and peek the cryptographic system, thereby leading to low security of the encryption algorithm.

In response to the above security problem, in an embodiment of the present disclosure, a plurality of algorithm components (also referred to as sub-algorithms) used in the current encryption may be selected from the first algorithm library using a reconfigurable security blank chip (also referred to as a reconfigurable processor), and the reconfigurable processor is configured accordingly to construct the security algorithm used this time. For example, the encryption circuit used by the current encryption algorithm is constructed. In order to further improve security, the sub-algorithms in the first algorithm library may be derived from mutually independent parties. For example, the sub-algorithms may be derived from a vendor of the chip, a user, an authenticator, a management party, etc., so that the first configuration information of the sub-algorithms in the first algorithm library is not completely grasped by either party. In addition, for a specific security algorithm, different configuration information may be used to describe the function of the security algorithm, thereby reducing the predictability of the security algorithm circuit, and greatly improving the security of the security algorithm.

In addition, in the prior art, the conventional security chip can only change the parameter configuration in the security algorithm. For example, only the encryption component, the feedback shift register, the private key expansion algorithm, tables and functions, etc., can be changed, so that these parameter configurations become dynamic programming elements to improve the security of the security algorithms in the prior art.

Compared with only changing the parameter configuration of the security algorithm, the embodiment of the present disclosure utilizes the reconfigurability of the reconfigurable processor, and in the process of implementing the security algorithm, selects and combines multiple sub-algorithms in real time from the first algorithm library to construct the security algorithm used this time, thereby greatly reducing the probability that the security algorithm is compromised and improving the security of the encryption algorithm. At the same time, it has excellent computing efficiency and can meet the encryption and decryption requirements of high security application scenarios.

In addition, compared with using a plurality of cascaded application specific integrated circuit (ASIC) modules to implement a combined algorithm, the combined algorithm (also referred to as security algorithm) implemented by the embodiment of the present disclosure is more flexible and more difficult to predict and analyze, which is beneficial to improve the security/privacy of security algorithms (such as encryption algorithms). Moreover, the reconfigurability of the reconfigurable processor well meets the requirements of the implementation of such combined algorithm. For example, a fixed number of ASIC modules may be specifically attacked and the security of the system after combining the modules may not be improved. However, the security algorithm of the embodiment of the present disclosure is difficult to be attacked due to its unpredictability.

According to the embodiment of the present disclosure, the reconfigurable processor is configured according to a first configuration information of each sub-algorithm of the plurality of sub-algorithms and a first combination configuration information indicating a combination connection relationship of each sub-algorithms, therefore, the security of the security algorithm and the security of the security algorithm implementation process can be ensured, the security risks of the sensitive data management and the risk of the side channel attacks can be prevented, and the security is extremely high.

The method shown in FIG. 2A and FIG. 2B will be further described below with reference to FIGS. 3A to 3E and FIG. 3G in conjunction with specific embodiments.

Figure 3A:
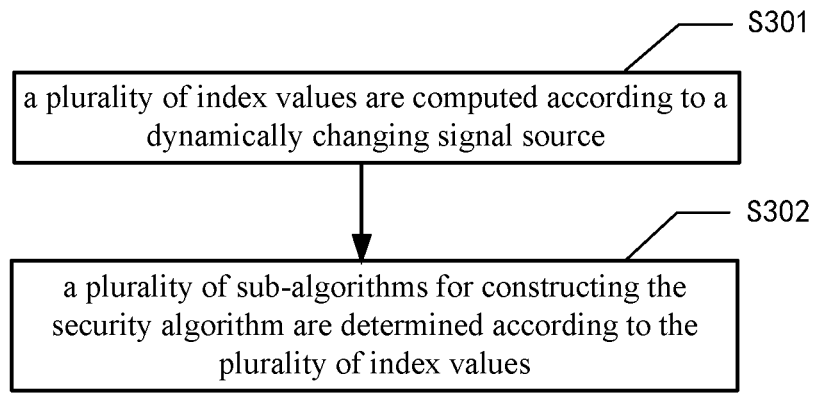
FIG. 3A schematically illustrates a flow chart for determining a plurality of sub-algorithms for constructing a security algorithm, in accordance with an embodiment of the present disclosure.

FIG. 3A schematically illustrates a flow chart for determining a plurality of sub-algorithms for constructing a security algorithm, in accordance with an embodiment of the present disclosure. As described in FIG. 3A, determining a plurality of sub-algorithms for constructing a security algorithm may include operation S301 and operation S302.

In operation S301, a plurality of index values are computed according to a dynamically changed signal source.

In operation S302, a plurality of sub-algorithms for constructing the security algorithm are determined according to the plurality of index values.

In an embodiment of the present disclosure, each sub-algorithm has an identifier (e.g., a serial number) that can uniquely represent itself. Therefore, when determining a plurality of sub-algorithms for constructing a security algorithm, a plurality of index values may be computed first, and then the plurality of index values are matched with the identifiers of the sub-algorithms, and the sub-algorithms corresponding to the successfully matched identifiers are used as the plurality of sub-algorithms for constructing the security algorithm.

Specifically, the plurality of index values may be computed according to the dynamically changed signal source. Wherein, the dynamically changed signal source may be unique and irreversible. For example, it may be a feature parameter, a scene parameter, or the like of the reconfigurable processor. Thus, the index value computed from the dynamically changed signal source may also be unique, irreversible, and dynamically changed. That is to say, after this computation, other devices or users cannot guess which sub-algorithms the security algorithm is constructed, thus greatly improving the security of the security algorithm.

As an optional embodiment, when the plurality of index values are computed according to the dynamically changed signal source, the plurality of index values may be computed according to the feature parameter and the scene parameter of the reconfigurable processor. The feature parameter may include hardware feature parameter, the scene parameter may include system time or ambient temperature, and the dynamically changed signal source may include the feature parameter and the scene parameter of the reconfigurable processor, and the like.

For example, the process deviation of a reconfigurable processor is equivalent to the fingerprint of a reconfigurable processor, and the process deviation of different reconfigurable processors is different, so the process deviation may be used as a hardware feature parameter. Alternatively, the process deviation may also be replaced with an identity ID code. However, in comparison, the process deviation is used to identify the identity of the reconfigurable processor for greater security.

It should be understood that different application scenarios may use different security algorithms. The manner of selecting sub-algorithms using feature parameters (for example, process deviation) and scene parameters (for example, time) is only one embodiment, and other dynamically changed signal sources may also be used as a basis for selecting sub-algorithms. The embodiment of the present disclosure does not limit this.

According to an embodiment of the present disclosure, the plurality of index values are computed according to the feature parameter and the scene parameter of the reconfigurable processor, and then the plurality of sub-algorithms are determined, since the feature parameter and the scene parameter of the reconfigurable processor are unique and irreversible, the security, anti-aggression and unpredictability of the security algorithm are greatly improved.

As an optional embodiment, when determining the plurality of sub-algorithms for constructing the security algorithm according to the plurality of index values, a corresponding plurality of sub-algorithms may be selected from the first algorithm library according to the plurality of index values. The first algorithm library includes the first configuration information of the N sub-algorithms, where N is greater than the number of sub-algorithms selected this time.

As described above, the first algorithm library may include the first configuration information of a plurality of sub-algorithms, for example, N sub-algorithms. Where N is a positive integer greater than 1, and N is greater than the number of sub-algorithms selected this time. Generally, the larger the number of algorithms included in the first algorithm library, the smaller the probability that the above security algorithm is broken. When the first algorithm library is implemented, the number of algorithms in the first algorithm library may be set according to actual needs, which is not limited by the embodiment of the present disclosure.

Embodiments of the present disclosure will be described in detail below based on a specific example.

For example, assume that the first algorithm library includes the first configuration information of N (e.g., N is an integer greater than 30) sub-algorithms. The first configuration information of each sub-algorithm is described by the configuration information of the reconfigurable computing processor. The security algorithm A used in the current encryption may be composed of any three of the above 30 sub-algorithms, and these 30 sub-algorithms are developed and provided by three organizations of A, B, and C respectively based on the reconfigurable processor. For example, 10 sub-algorithms are provided by Party A; 10 sub-algorithms are provided by Party B; and 10 sub-algorithms are provided by Party C. When the reconfigurable processor is powered on, the first configuration information of the 30 sub-algorithms may first be loaded into the internal memory of the reconfigurable processor. In this way, when encrypting, the reconfigurable processor may select and read three specific sub-algorithms from the internal memory to form the security algorithm A according to its own process deviation and scene parameters. Then, the reconfigurable processor is configured to implement the function of the security algorithm A according to the first configuration information a of the sub-algorithm a, the first configuration information b of the sub-algorithm b, the first configuration information c of the sub-algorithm c, and the first combination configuration information of the three sub-algorithms (configuration Information corresponding to a combination connection mode).

It should be understood that the selection of the three sub-algorithms to construct the above security algorithm A is only an example, and the present disclosure does not limit the number of sub-algorithms selected, as long as the number of selected sub-algorithms is greater than one. The sub-algorithm combination method shown in FIG. 2B (that is, the sub-algorithm a, the sub-algorithm b, and the sub-algorithm c are sequentially arranged) is also only one implementation manner of the present disclosure, and the selected sub-algorithms may also form the security algorithm A according to other methods. However, the security algorithm A formed after the combination needs to be reversible so that decryption may be accomplished using the key. For example, the combination method of the security algorithm A may be a one-dimensional arrangement, or a two-dimensional array combination, or a more complicated other form (like a stream cipher, etc.).

Alternatively, in the embodiment of the present disclosure, the first algorithm library may be stored in a memory outside the reconfigurable processor. When certain conditions are met, some or all of the first algorithm library is selectively loaded into the internal memory of the reconfigurable processor. For example, the condition may be the power up of the reconfigurable processor. In this way, the storage cost of the reconfigurable processor may be reduced.

As mentioned before, each sub-algorithm in the first algorithm library has an identifier (e.g., a serial number) that can uniquely represent itself, and these identifiers may also be stored in the first algorithm library. When a plurality of index values are computed according to the dynamically changed signal source, and the plurality of index values can be successfully matched with some of the identifiers, the corresponding sub-algorithms may be selected from the first algorithm library, and then the security algorithm may be constructed by the selected sub-algorithms.

It can be seen that the privacy and impractability of the identifier of the sub-algorithm are important in the process of implementing the security algorithm. Therefore, it is necessary to improve the reliability of the identifier of the sub-algorithm.

As an optional embodiment, when the first algorithm library is loaded into the reconfigurable processor, the feature parameters of the reconfigurable processor are used to generate identifiers for uniquely representing each sub-algorithms in the first algorithm library. Since the feature parameters of each reconfigurable processor are unique, the identifiers of each sub-algorithms generated using the feature parameters of the reconfigurable processor are also unique and irreversible, thereby achieving the purpose of improving the reliability of the identifiers.

Figure 3B:
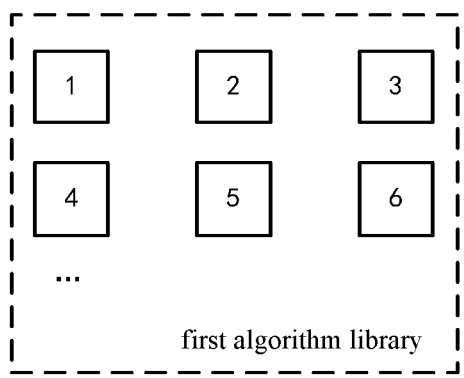
FIG. 3B is a diagram schematically showing a first algorithm library in accordance with an embodiment of the present disclosure.

FIG. 3B is a diagram schematically showing a first algorithm library in accordance with an embodiment of the present disclosure.

As shown in FIG. 3B, for convenience of description, it is assumed that the above identifier includes serial number 1, serial number 2, serial number 3, serial number 4, serial number 5, serial number 6, . . . and the like. These identifiers are stored in the first algorithm library in a one-to-one correspondence with each sub-algorithms, and these identifiers are generated according to the feature parameters of the reconfigurable processor when loaded into the reconfigurable processor.

According to the embodiment of the present disclosure, the identifiers of each sub-algorithms in the first algorithm library are generated by using the unique feature parameters, so that other devices cannot know the identifiers of the sub-algorithms used this time, thereby greatly improving the reliability of the identifiers. The above identifiers are generated when the first algorithm library is dynamically loaded into the reconfigurable processor, and even if any party obtains the complete first algorithm library through other non-technical methods, it is difficult to crack the above identifiers and restore the security algorithm, thus improving the security of the security algorithm.

As an optional embodiment, when the plurality of index values are computed according to the feature parameter and the scene parameter of the reconfigurable processor, each index value may be computed as follows: a first numerical value is computed according to a first preset algorithm based on the feature parameter and the scene parameter; then, the first numerical value is divided by the total number N of the sub-algorithms in the first algorithm library to obtain a corresponding remainder, and the remainder is used as an index value. It should be understood that the above manner of computing the index value is only one implementation manner of the embodiment of the present disclosure, and other transformation manners that can be thought of by those skilled in the art should also fall within the protection scope of the embodiment of the present disclosure.

Figure 3C:
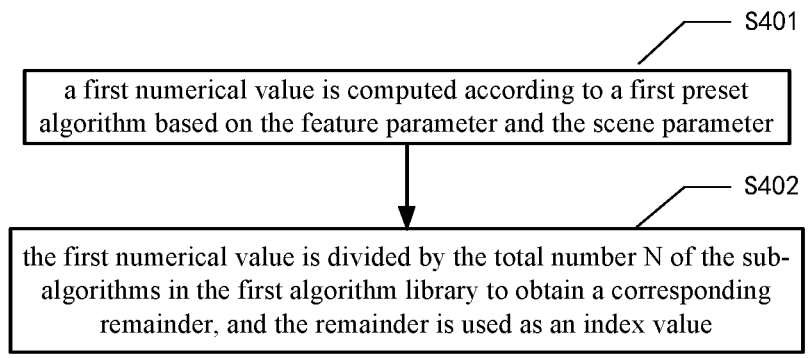
FIG. 3C schematically illustrates a flow chart for computing each of a plurality of index values according to a feature parameter and a scene parameter of the reconfigurable processor, according to an embodiment of the present disclosure.

FIG. 3C schematically illustrates a flow chart for computing each of a plurality of index values according to a feature parameter and a scene parameter of the reconfigurable processor, according to an embodiment of the present disclosure. As shown in FIG. 3C, computing each of the plurality of index values according to the feature parameter and the scene parameter of the reconfigurable processor may include operation S401 and operation S402.

In operation S401, a first numerical value is computed according to a first preset algorithm based on the feature parameter and the scene parameter.

In operation S402, the first numerical value is divided by the total number N of the sub-algorithms in the first algorithm library to obtain a corresponding remainder, and the remainder is used as an index value.

Next, the computed index value is matched with the identifier of the sub-algorithm. For example, it is determined whether the index value is equal to the identifier of any sub-algorithm in the first algorithm library. If so, the sub-algorithm uniquely represented by the identifier may be selected from the first algorithm library.

For example, suppose the feature parameter is an identity code and the scene parameter is time. After computing a numerical value according to the first preset algorithm based on the time and the identity code, the numerical value is divided by the total number N of the sub-algorithms in the first algorithm library to obtain a corresponding remainder. Then, a sub-algorithm with the identifier equal to the remainder is selected from the first algorithm library. In combination with the above example, the security algorithm A includes three sub-algorithms, three remainders need to be obtained through computation, and then three sub-algorithms for constructing the security algorithm A are selected accordingly.

It should be noted that, by performing operation S401 and operation S402 once, one index value may be computed. If the number of sub-algorithms used to construct the security algorithm is M, considering that the computed index value may not be successfully matched with the identifier, the number of times of performing operation S401 and operation S402 should be greater than or equal to M.

According to the embodiment of the present disclosure, the index values are computed based on the unique feature parameter and the irreversible scene parameter, and the corresponding sub-algorithms are selected according to the matching relationship between the index values and the identifiers to construct the security algorithm used this time, so that the outside world cannot know the sub-algorithms used this time by inverse method, which improves the security of the security algorithm.

Figure 3D:
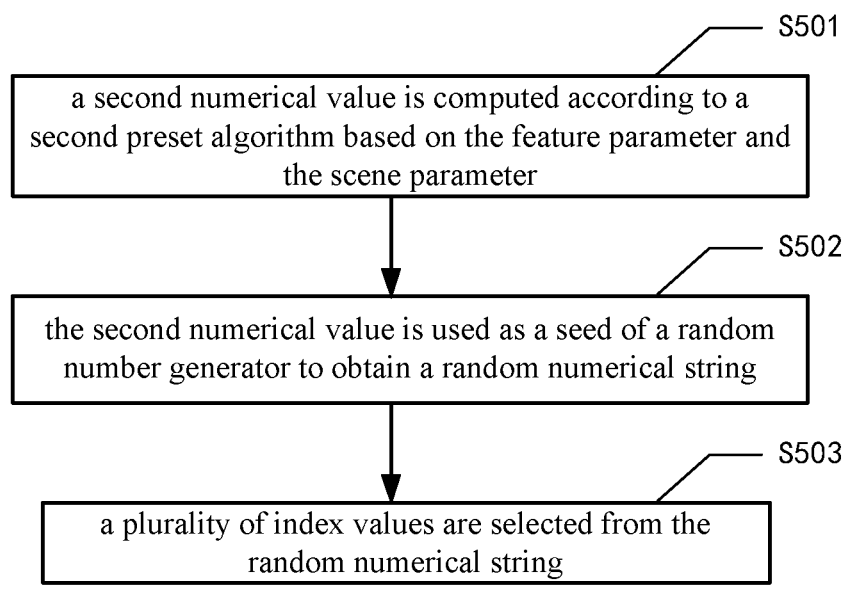
FIG. 3D schematically illustrates a flow chart for computing a plurality of index values according to the feature parameter and the scene parameter of the reconfigurable processor, according to an embodiment of the present disclosure.

FIG. 3D schematically illustrates a flow chart for computing a plurality of index values according to the feature parameter and the scene parameter of the reconfigurable processor, according to an embodiment of the present disclosure. As shown in FIG. 3D, computing a plurality of index values according to the feature parameter and the scene parameter of the reconfigurable processor may include operations S501 to S503.

In operation S501, a second numerical value is computed according to a second preset algorithm based on the feature parameter and the scene parameter.

In operation S502, the second numerical value is used as a seed of a random number generator to obtain a random numerical string.

In operation S503, a plurality of index values are selected from the random numerical string.

It should be noted that by performing operations S501 to S503 once, a plurality of index values may be selected. If the number of sub-algorithms used to construct the security algorithm is X, considering that one or more of the selected plurality of index values may not be successfully matched with the identifier, the number of the index values selected from the random numerical string in operation S503 should be greater than or equal to X.

For example, suppose the feature parameter is an identity code and the scene parameter is time. After computing a number according to the second preset algorithm based on the time and identity code, the number may be used as an input of the random number generator to obtain a string of numbers long enough (also called a random numerical string). Then, a numerical segment containing a plurality of numerical values is randomly intercepted from the random numerical string, the number of the plurality of numerical values being greater than or equal to the number of the sub-algorithms, and the numerical values in the numerical segment are used as index values. In combination with the above example, the number of the sub-algorithms used to construct the security algorithm A is 3, a numerical segment containing more than three numerical values may be intercepted from the random numerical string. Then, the numerical values contained in the numerical segment are used as index values to select sub-algorithms of the same identifiers from the first algorithm library.

It should be understood that, in order to achieve higher security, the above manner of computing the index values in the embodiment of the present disclosure needs to satisfy: 1. Irreversibility to prevent an attacker from obtaining a feature parameter by inverse calculation. The first preset algorithm and the second preset algorithm are both irreversible algorithms. For example, the irreversible algorithm may be a hash algorithm (SHA256 algorithm, SHA3 algorithm, SM3 algorithm, MD5 algorithm, etc.). 2. The computation results obtained by different inputs should also be different. Thus, since the scene parameter is a variable, and the feature parameter and the scene parameter are used as input to the computation, the computation results obtained each time are different.

According to the embodiment of the present disclosure, the index values are computed based on the unique feature parameter and the irreversible scene parameter, and the corresponding sub-algorithms are selected according to the matching relationship between the index values and the identifiers to construct the security algorithm used this time, so that the outside world cannot know the sub-algorithms used this time by inverse method, which improves the security of the security algorithm. Moreover, the index values may be computed in a variety of ways, making the computation method more flexible.

As an optional embodiment, when configuring the reconfigurable processor, a plurality of sub-algorithms are connected in the order indicated in a first combination configuration information, and two sub-algorithms connected to each other are not related. It should be understood that it is merely a preferred embodiment of the present disclosure that two sub-algorithms connected to each other are not related. When the number of the sub-algorithms of the security algorithm A is odd, even if one or more sub-algorithms are related to the preceding sub-algorithms, the security algorithm A may still achieve a certain encryption security.

It should be noted that the connection order of the sub-algorithms indicated in the first combination configuration information may be a sequential order in which the sub-algorithms are selected, or may be a randomly set order. Here, the connection order of the sub-algorithms indicated in the first combination configuration information only needs to satisfy the reversibility so that the corresponding decryption task may be completed.

According to the embodiment of the present disclosure, the plurality of sub-algorithms are connected in the order indicated in the first combination configuration information, and the connection order of the sub-algorithms may be dynamically changed by changing the first combination configuration information, thereby ensuring the variability of the connection order of each sub-algorithms in the security algorithm, improving the security of the security algorithm. In addition, by making the two sub-algorithms connected to each other in the security algorithm irrelevant, the reduction in the security of the constructed security algorithm may be avoided.

As an optional embodiment, after the reconfigurable processor is configured, when the reconfigurable processor is used to implement the security algorithm, the key points of the circuit used to implement the security algorithm in the reconfigurable processor may be reconfigured in real time, and/or a delay circuit may be randomly added to the critical path of the circuit used to implement the security algorithm in the reconfigurable processor to prevent side channel attacks.

Since the security algorithm is constructed from one or more sub-algorithms, then at the design stage of the sub-algorithms, annotations may be added at the location of an operation or function described by the high-level language. In this way, when the reconfigurable processor implements the security algorithm, two or more reconfiguration methods (for example, position replacement, random delay, different implementations of logic circuits, etc.) may be selected to dynamically and randomly reconfigure the annotated key points of the circuit. In the process of dynamic and random reconfiguration, the key points of the circuit and/or reconfiguration methods of the current reconfiguration may also be selected according to the output of the random number generator.

In addition, the delay circuit may also be randomly inserted for the critical path of the circuit in the encryption circuit. For example, the longest circuit in the encryption circuit may be selected as the critical path, or the delay annotation may be used to identify the critical path. Thus, for a path with a delay annotation, a delay circuit may be randomly inserted according to the read random numerical value.

Figure 3E:
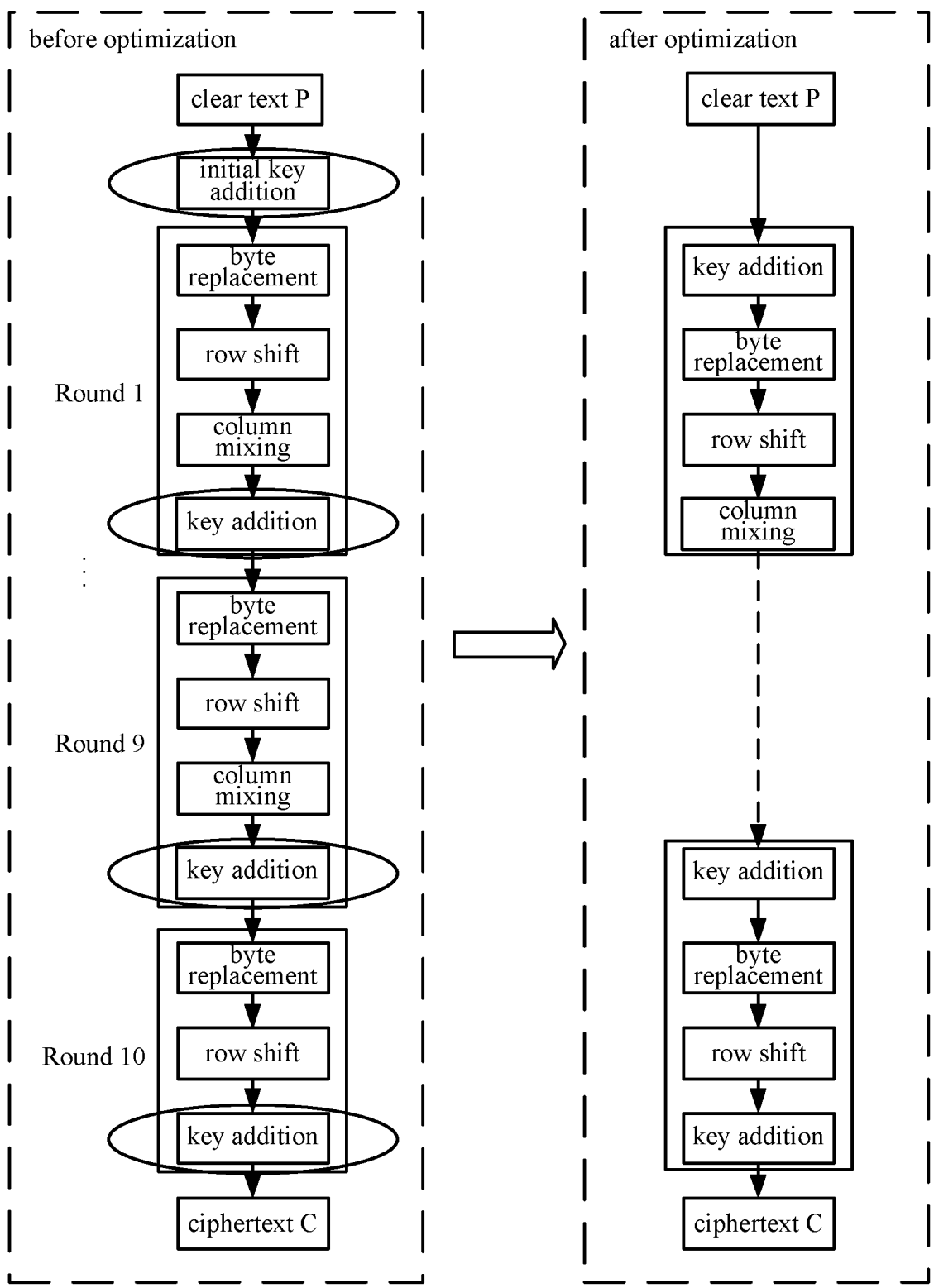
FIG. 3E is a schematic diagram showing the addition of a delay circuit into a critical path of the circuit in accordance with an embodiment of the present disclosure.

FIG. 3E is a schematic diagram showing the addition of a delay circuit into a critical path of the circuit in accordance with an embodiment of the present disclosure.

The encryption algorithm is taken as an example of the security algorithm, and the embodiment of the present disclosure is described in detail in conjunction with 3E. The left diagram of FIG. 3E shows the circuit of the encryption algorithm before optimization, in which "initial key addition", "key addition" of Round1, . . . , "key addition" of Round9, and "key addition" of Round10 are all paths with delay circuits, that is, "initial key addition", "key addition" of Round1, . . . , "key addition" of Round9, and "key addition" of Round10 are all critical paths of the circuit. The right diagram of FIG. 3E shows the circuit of the encryption algorithm after optimization. After comparison, it can be seen that the optimized encryption algorithm has added delay circuits to the critical paths of the circuit.

According to an embodiment of the present disclosure, in the process of implementing the security algorithm, the reconfigurable security blank chip may dynamically reconfigure the key points of the circuit (for example, the circuit corresponding to key operations/functions) in the security algorithm in real time by using its own reconfigurability, and/or randomly add a delay circuit into the critical path of the circuit, to improve the security of the security algorithm implementation process, and enable the security algorithm to effectively defend against side channel attacks.

In order to explain the advantageous effects achieved by the embodiments of the present disclosure in more detail, the following description will be made in conjunction with FIGS. 3F and 3G.

Figure 3F:
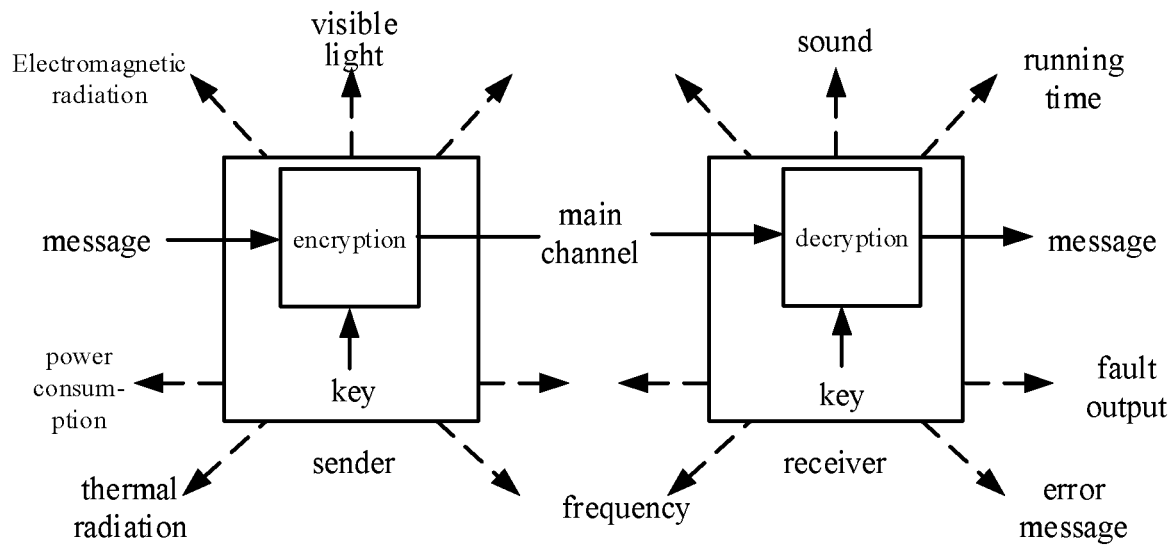
FIG. 3F is a schematic diagram showing the acquisition of key information by an attacker by measuring side channel signals of the circuit in the prior art.
Figure 3G:
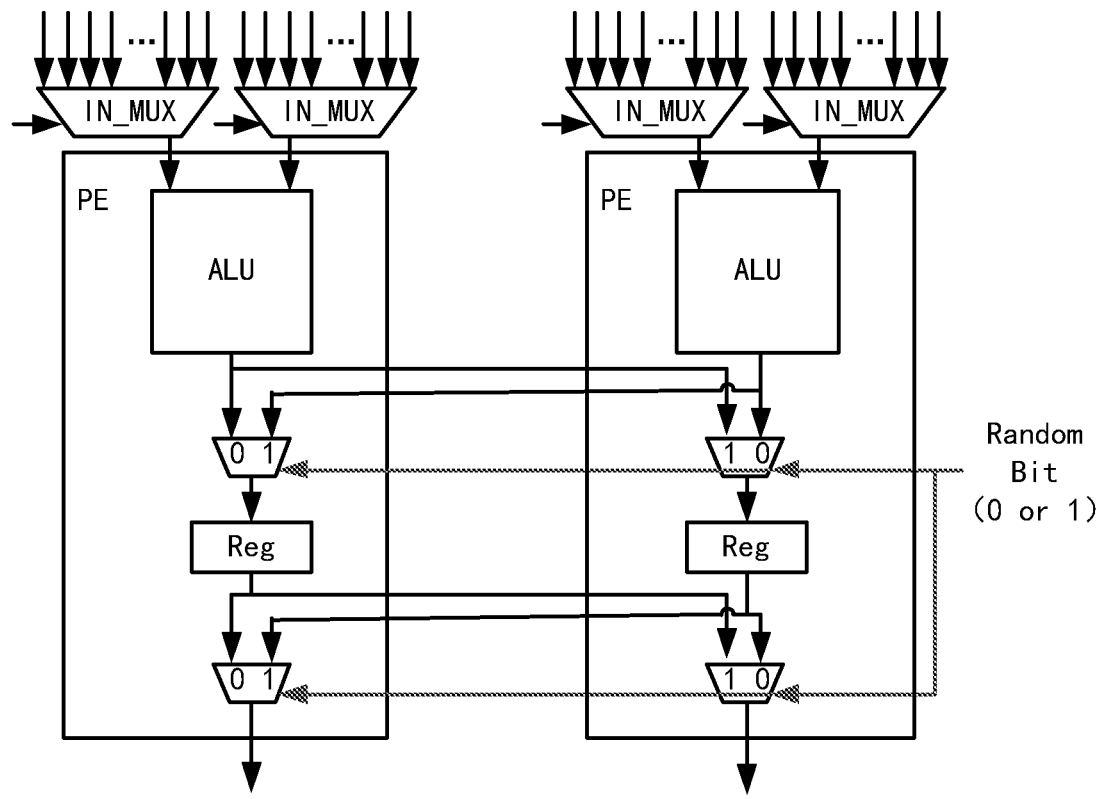
FIG. 3G is a schematic diagram showing the change of the mapping position of the key data registers in accordance with an embodiment of the present disclosure.

FIG. 3F is a schematic diagram showing the acquisition of key information by an attacker by measuring side channel signals of the circuit in the prior art. FIG. 3G is a schematic diagram showing the change of the mapping position of the key data registers in accordance with an embodiment of the present disclosure.

As shown in FIG. 3F, the precondition of the side channel attack in the prior art is the stability of time or space of the circuit, and the attacker measures the side channel (except the main channel) information of the circuit to obtain key information, wherein the side channel information may include the electromagnetic radiation, thermal radiation, etc. in the figure.

However, the reconfigurable processor in the embodiment of the present disclosure can break the law of the power consumption curve by changing the time characteristic of the circuit, for example, randomly inserting the delay circuit into the critical path of the circuit to break the basis of the power consumption attack. It is also possible to break the law of the fault mode by changing the spatial characteristics of the circuit in the reconfigurable processor. As shown in FIG. 3G, the basis of the fault attack is broken by randomly changing the mapping position of the key data registers in the data path. For example, a random bit-driven 1-out-of-2 multiplexer (Input Multiplexer, abbreviated as IN_MUX) is used to change the positional correspondence between an arithmetic logical unit (ALU) and a register (abbreviated as Reg). Wherein, "0" and "1" in FIG. 3G may represent a random bit.

It should be noted that the present disclosure uses a variety of sub-algorithms to combine and construct a security algorithm, and may also obtain a large number of new sub-algorithms by changing the parameters of the sub-algorithms. The new sub-algorithms are used in the short-term or small-scale, and have similar security to the commercial encryption (from the existing commercial encryption algorithm). The reconfigurable processor does not retain the relevant information of the sub-algorithm (or the final implementation of the sub-algorithm is determined by the chip structure and the configuration information, and the specific implementation of the algorithm cannot be obtained by reverse engineering before use). In addition, the configuration of the reconfigurable processor is randomized (including randomly changing the mapping position of key data registers in the data path, randomly inserting delay circuits in the critical path of the circuit, etc.), which may break the theoretical basis of side channel attacks, and the preventive effect of side channel attacks is better than that of other chips.

Figure 4A:
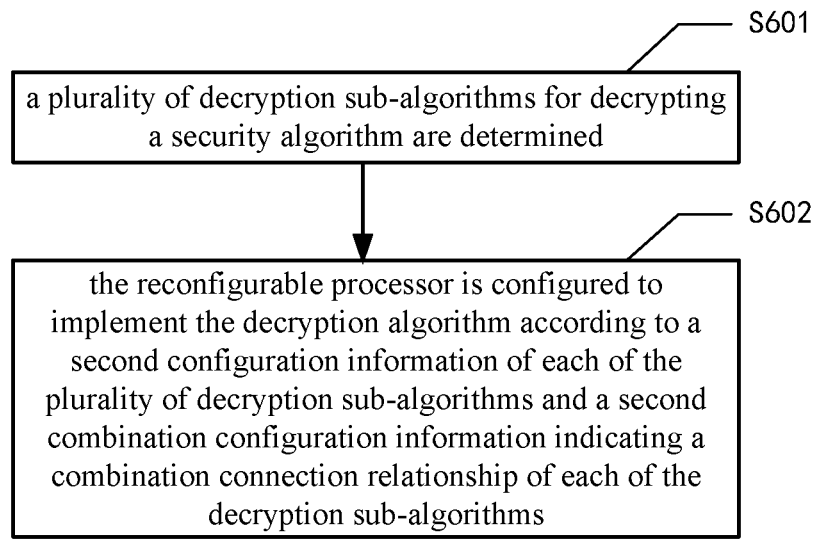
FIG. 4A schematically illustrates a flow chart for a method of implementing a decryption algorithm using a reconfigurable processor, in accordance with an embodiment of the present disclosure.

FIG. 4A is a flow chart that schematically illustrates a method of implementing a decryption algorithm using a reconfigurable processor, in accordance with an embodiment of the present disclosure. As shown in FIG. 4A, the method of implementing a decryption algorithm using a reconfigurable processor may include an operation S601 and an operation S602.

In operation S601, a plurality of decryption sub-algorithms for decrypting a security algorithm are determined.

In operation S602, the reconfigurable processor is configured to implement the decryption algorithm according to a second configuration information of each of the plurality of decryption sub-algorithms and a second combination configuration information indicating a combination connection relationship of each decryption sub-algorithms.

According to an embodiment of the present disclosure, each decryption sub-algorithm corresponds to a second configuration information, and the second configuration information includes the circuit logic structure of the corresponding decryption sub-algorithm. It should be understood that when the security algorithm is an encryption algorithm, a corresponding decryption algorithm is required to complete the data decryption. Moreover, the number of the decryption sub-algorithms used to construct the decryption algorithm should be the same as the number of the sub-algorithms used to construct the security algorithm, the second configuration information of each decryption sub-algorithm should correspond to the first configuration information of each sub-algorithm used to construct the security algorithm respectively, and the second combination configuration information of each decryption sub-algorithms should correspond to the first combination configuration information of each sub-algorithms used to construct the security algorithm.

Figure 4B:
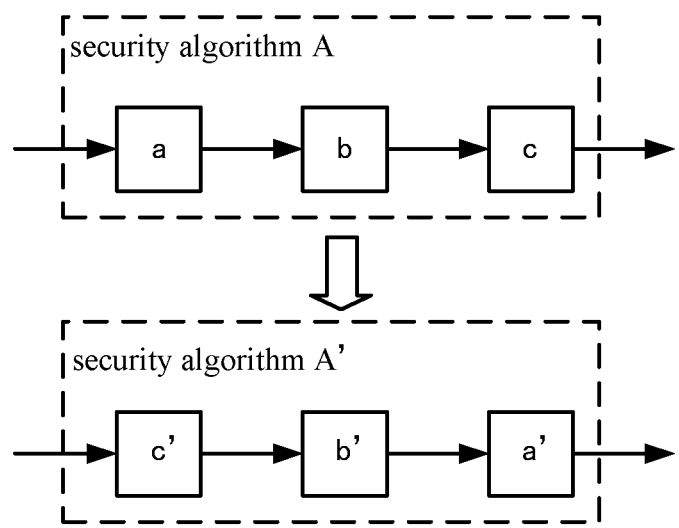
FIG. 4B is a schematic diagram showing the determination of a plurality of decryption sub-algorithms for decrypting a security algorithm, in accordance with an embodiment of the present disclosure.

FIG. 4B is a schematic diagram showing the determination of a plurality of decryption sub-algorithms for decrypting a security algorithm, in accordance with an embodiment of the present disclosure. As shown in FIG. 4B, it is assumed that the security algorithm A is an encryption algorithm. In the following, a method for obtaining the decryption algorithm is described, taking the case where the sub-algorithm a, the sub-algorithm b, and the sub-algorithm c are sequentially arranged to form the security algorithm A as an example.

Specifically, the identifier of the corresponding decryption sub-algorithm a', the identifier of the corresponding decryption sub-algorithm b', and the identifier of the corresponding decryption sub-algorithm c' may be determined according to the identifier of the sub-algorithm a, the identifier of the sub-algorithm b, and the identifier of the sub-algorithm c. Then, corresponding second configuration information may be obtained accordingly. Then, according to the reverse order of the order of the sub-algorithm a, the sub-algorithm b, and the sub-algorithm c, the order of each decryption sub-algorithms in the decryption algorithm A' is obtained, or the second combination configuration information corresponding to the first combination configuration information is obtained accordingly.

It should be understood that the security algorithm A may be other algorithms for generating signatures and the like. In the scenario where the security algorithm A is not an encryption algorithm, a corresponding decryption algorithm is generally not required. In the above example, the sub-algorithm a, the sub-algorithm b, and the sub-algorithm c are sequentially arranged to form the security algorithm A, which is only one specific implementation manner of the embodiment of the present disclosure. Accordingly, regardless of the combination connection order of the security algorithm A in which each sub-algorithms are connected, the combination connection order of the decryption algorithm A' is required to be the reverse order of the security algorithm A.

According to the embodiment of the present disclosure, the reconfigurable processor is configured according to a second configuration information of each of the plurality of decryption sub-algorithms and a second combination configuration information indicating a combination connection relationship of each decryption sub-algorithms, therefore, the security of the decryption algorithm and the security of the decryption process of the security algorithm can be ensured, and the security risks of the sensitive data management and the risk of the side channel attacks can be prevented.

Figure 5:
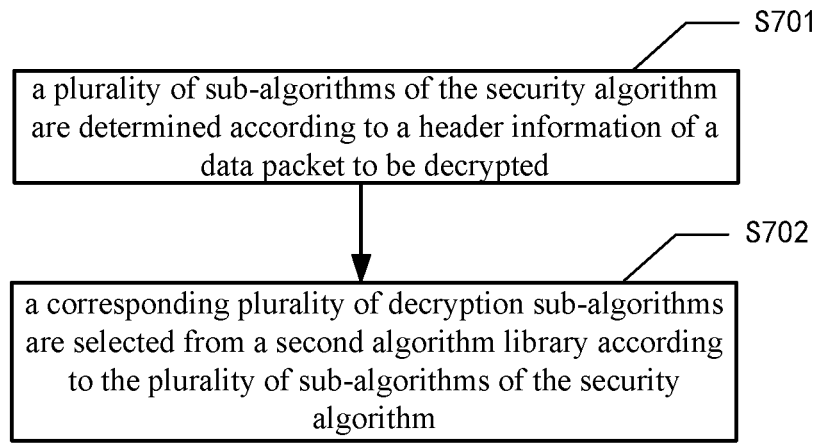
FIG. 5 schematically illustrates a flow chart for determining a plurality of decryption sub-algorithms for decrypting a security algorithm, in accordance with an embodiment of the present disclosure.

The method illustrated in FIGS. 4A and 4B will be further described with reference to FIG. 5 in conjunction with a specific embodiment. FIG. 5 schematically illustrates a flow chart for determining a plurality of decryption sub-algorithms for decrypting a security algorithm, in accordance with an embodiment of the present disclosure. As shown in FIG. 5, determining a plurality of decryption sub-algorithms for decrypting the security algorithm may include operation S701 and operation S702.

In operation S701, a plurality of sub-algorithms of the security algorithm are determined according to a header information of a data packet to be decrypted.

In operation S702, a corresponding plurality of decryption sub-algorithms are selected from a second algorithm library according to the plurality of sub-algorithms of the security algorithm.

In the embodiment of the present disclosure, parameter information of the plurality of sub-algorithms used to construct the security algorithm (for example, an identifier of each sub-algorithm and an ordering information of each sub-algorithms) may be used as a header of the data packet, and be saved together with the processed data. In the scenario where the security algorithm is an encryption algorithm, the sub-algorithms of the encryption algorithm and the decryption sub-algorithms of the decryption algorithm may appear in pairs in the algorithm library. Therefore, the corresponding decryption sub-algorithms may be obtained according to the identifiers of the sub-algorithms of the encryption algorithm. When decryption is required, the reconfigurable processor may first read the header information of the data packet to be decrypted to obtain parameter information of each sub-algorithm of the security algorithm, and then generate a corresponding decryption algorithm A' according to the parameter information of each sub-algorithm to configure the reconfigurable processor for decryption operations.

Specifically, the header information of the data packet to be decrypted may be parsed, then the second configuration information and the second combination configuration information used to construct the decryption algorithm are obtained, and the reconfigurable processor is configured to implement the decryption algorithm. As described above, when the data is encrypted, the identifiers of the sub-algorithms are generated when the algorithm library is dynamically loaded into the reconfigurable processor. Thus, if the reconfigurable processor performing the decryption is different from the reconfigurable processor performing the encryption, the reconfigurable processor performing the encryption needs to notify the generated identifiers to the reconfigurable processor performing the decryption. In this case, even if any party obtains a complete algorithm library through other non-technical methods, the encryption algorithm or the decryption algorithm cannot be cracked according to the algorithm identifiers in the packet header information, thereby improving the security of the algorithm.

It should be noted that the first algorithm library and the second algorithm library in the embodiment of the present disclosure may be implemented as the same algorithm library. That is, the algorithm library may include both the sub-algorithms for constructing a security algorithm and the decryption sub-algorithms for decrypting the security algorithm.

As an optional embodiment, before the reconfigurable processor is configured according to a second configuration information of each of the plurality of decryption sub-algorithms and a second combination configuration information indicating a combination connection relationship of each decryption sub-algorithms, the second combination configuration information may also be generated according to the reverse order of the connection order of the plurality of sub-algorithms in the security algorithm. That is to say, the second combination configuration information may be generated according to the reverse order of the connection order of the plurality of sub-algorithms in the security algorithm.

For example, the connection order of the sub-algorithm a, the sub-algorithm b, and the sub-algorithm c in the security algorithm is a-b-c, and the sub-algorithm a corresponds to the decryption sub-algorithm a', the sub-algorithm b corresponds to the decryption sub-algorithm b', the sub-algorithm c corresponds to the decryption sub-algorithm c', then the connection order of the decryption sub-algorithm a', the decryption sub-algorithm b' and the decryption sub-algorithm c' represented by the second combination configuration information shall be c'-b'-a'.

It should be noted that the above combination connection manner of the sub-algorithms is only one implementation manner of the present disclosure, and the selected sub-algorithms may also constitute a security algorithm according to other manners. Correspondingly, the selected decryption sub-algorithms may also constitute a decryption algorithm according to other manners, and the embodiment of the present disclosure is not limited thereto.

Figure 6:
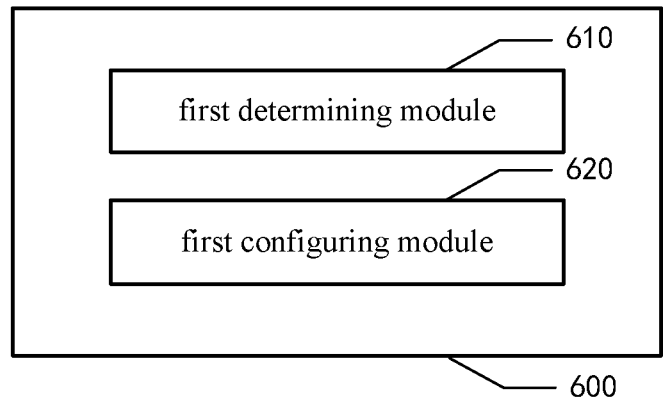
FIG. 6 schematically illustrates a block diagram of a system of implementing a security algorithm using a reconfigurable processor, in accordance with an embodiment of the present disclosure.

FIG. 6 is a block diagram that schematically illustrates a system for implementing a security algorithm using a reconfigurable processor, in accordance with an embodiment of the present disclosure.

As shown in FIG. 6, the system 600 for implementing a security algorithm using a reconfigurable processor may include a first determining module 610 and a first configuring module 620.

The first determining module 610 is configured to determine a plurality of sub-algorithms for constructing the security algorithm.

The first configuring module 620 is configured to configure the reconfigurable processor to implement the security algorithm according to a first configuration information of each sub-algorithm of the plurality of sub-algorithms and a first combination configuration information indicating a combination connection relationship of each sub-algorithms.

According to the embodiment of the present disclosure, the reconfigurable processor is configured according to a first configuration information of each sub-algorithm of the plurality of sub-algorithms and a first combination configuration information indicating a combination connection relationship of each sub-algorithms, therefore, the security of the security algorithm and the security of the security algorithm implementation process can be ensured, the security risks of the sensitive data management and the risk of the side channel attacks can be prevented, and the security is extremely high.

With reference to FIG. 7A to FIG. 7E, the system shown in FIG. 6 will be further described combined with specific embodiments.

Figure 7A:
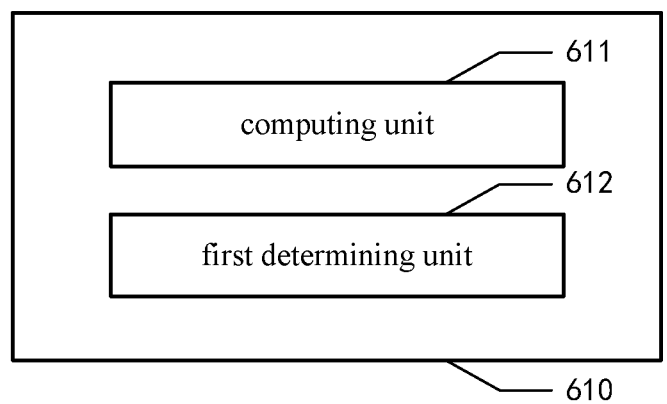
FIG. 7A schematically shows a block diagram of the first determining module in accordance with an embodiment of the present disclosure.

FIG. 7A schematically shows a block diagram of the first determining module in accordance with an embodiment of the present disclosure.

As shown in FIG. 7A, the first determining module 610 may include a computing unit 611 and a first determining unit 612.

The computing unit 611 is configured to compute a plurality of index values according to a dynamically changed signal source.

The first determining unit 612 is configured to determine the plurality of sub-algorithms for constructing the security algorithm according to the plurality of index values.

According to an embodiment of the present disclosure, the index value computed from the dynamically changed signal source may also be unique, irreversible, and dynamically changed. That is to say, after this computation, other devices or users cannot guess which sub-algorithms the security algorithm is constructed, thus greatly improving the security of the security algorithm.

As an optional embodiment, the computing unit is also configured to compute the plurality of index values according to a feature parameter and a scene parameter of the reconfigurable processor, wherein, the feature parameter includes hardware feature parameter, and the scene parameter includes system time or ambient temperature.

According to an embodiment of the present disclosure, the plurality of index values are computed according to the feature parameter and the scene parameter of the reconfigurable processor, and then the plurality of sub-algorithms are determined, since the feature parameter and the scene parameter of the reconfigurable processor are unique and irreversible, the security, anti-aggression and unpredictability of the security algorithm are greatly improved.

As an optional embodiment, the first determining unit is also configured to select the plurality of sub-algorithms corresponding to the plurality of index values from a first algorithm library according to the plurality of index values, wherein, the first algorithm library includes the first configuration information of N sub-algorithms, where N is greater than a number of sub-algorithms selected this time.

Figure 7B:
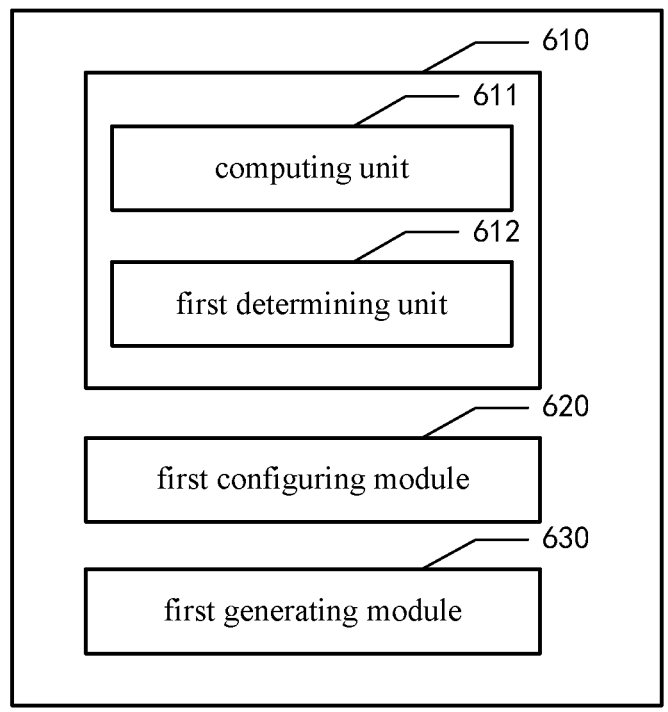
FIG. 7B schematically shows a block diagram of a system of implementing a security algorithm using a reconfigurable processor, in accordance with another embodiment of the present disclosure.

FIG. 7B schematically shows a block diagram of a system of implementing a security algorithm using a reconfigurable processor, in accordance with another embodiment of the present disclosure.

As shown in FIG. 7B, the system 600 of implementing a security algorithm using a reconfigurable processor may further include a first generating module 630.

The first generating module 630 is configured to, when the first algorithm library is loaded into the reconfigurable processor, use the feature parameter of the reconfigurable processor to generate identifiers for uniquely representing each sub-algorithms in the first algorithm library.

According to the embodiment of the present disclosure, the identifiers of each sub-algorithms in the first algorithm library are generated by using the unique feature parameters, so that other devices cannot know the identifiers of the sub-algorithms used this time, thereby greatly improving the reliability of the identifiers. The above identifiers are generated when the first algorithm library is dynamically loaded into the reconfigurable processor, and even if any party obtains the complete first algorithm library through other non-technical methods, it is difficult to crack the above identifiers and restore the security algorithm, thus improving the security of the security algorithm.

As an optional embodiment, the computing unit is further configured to compute each of the plurality of index values as follows: a first numerical value is computed according to a first preset algorithm based on the feature parameter and the scene parameter; then, the first numerical value is divided by the total number N of the sub-algorithms in the first algorithm library to obtain a corresponding remainder, and the remainder is used as an index value.

According to the embodiment of the present disclosure, the index values are computed based on the unique feature parameter and the irreversible scene parameter, and the corresponding sub-algorithms are selected according to the matching relationship between the index values and the identifiers to construct the security algorithm used this time, so that the outside world cannot know the sub-algorithms used this time by inverse method, which improves the security of the security algorithm.

Figure 7C:
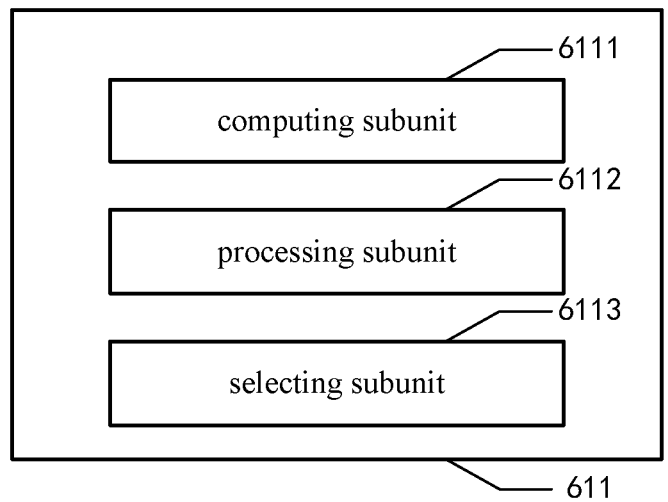
FIG. 7C schematically shows a block diagram of a computing unit according to an embodiment of the present disclosure.

FIG. 7C schematically shows a block diagram of a computing unit according to an embodiment of the present disclosure.

As shown in FIG. 7B, the computing unit 611 may include a computing subunit 6111, a processing subunit 6112 and a selecting subunit 6113.

The computing subunit 6111 is configured to compute a second numerical value according to a second preset algorithm based on the feature parameter and the scene parameter.

The processing subunit 6112 is configured to use the second numerical value as a seed of a random number generator to obtain a random numerical string.

The selecting subunit 6113 is configured to select the plurality of index values from the random numerical string.

According to the embodiment of the present disclosure, the index values are computed based on the unique feature parameter and the irreversible scene parameter, and the corresponding sub-algorithms are selected according to the matching relationship between the index values and the identifiers to construct the security algorithm used this time, so that the outside world cannot know the sub-algorithms used this time by inverse method, which improves the security of the security algorithm. Moreover, the index values may be computed in a variety of ways, making the computation method more flexible.

Figure 7D:
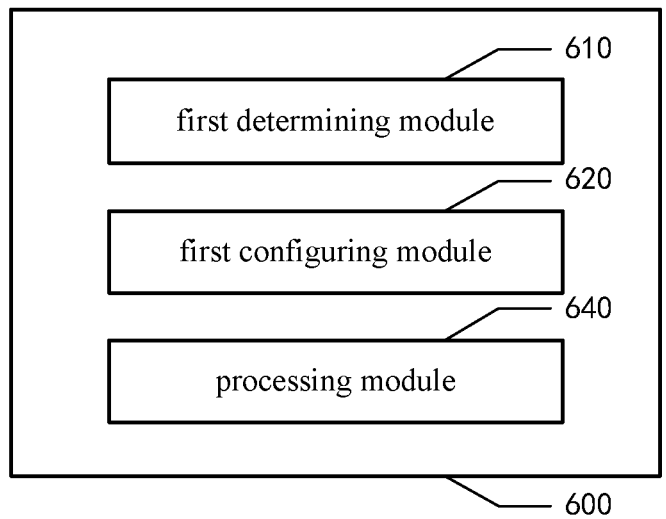
FIG. 7D schematically shows a block diagram of a system of implementing a security algorithm using a reconfigurable processor, in accordance with another embodiment of the present disclosure.

FIG. 7D schematically shows a block diagram of a system of implementing a security algorithm using a reconfigurable processor, in accordance with another embodiment of the present disclosure.

As shown in FIG. 7D, the system 600 of implementing a security algorithm using a reconfigurable processor may further include a processing module 640.

The processing module 640 is configured to, when configuring the reconfigurable processor, connect the plurality of sub-algorithms in an order indicated in the first combination configuration information, with two sub-algorithms connected to each other being not related.

According to the embodiment of the present disclosure, the plurality of sub-algorithms are connected in the order indicated in the first combination configuration information, and the connection order of the sub-algorithms may be dynamically changed by changing the first combination configuration information, thereby ensuring the variability of the connection order of each sub-algorithms in the security algorithm, improving the security of the security algorithm. In addition, by making the two sub-algorithms connected to each other in the security algorithm irrelevant, the reduction in the security of the constructed security algorithm may be avoided.

As an optional embodiment, the system of implementing a security algorithm using a reconfigurable processor further comprises: a reconfiguring module configured to, after configuring the reconfigurable processor, reconfigure in real time a key point of a circuit used to implement the security algorithm in the reconfigurable processor; and/or an adding module configured to add randomly a delay circuit into a critical path of the circuit used to implement the security algorithm in the reconfigurable processor.

Figure 7E:
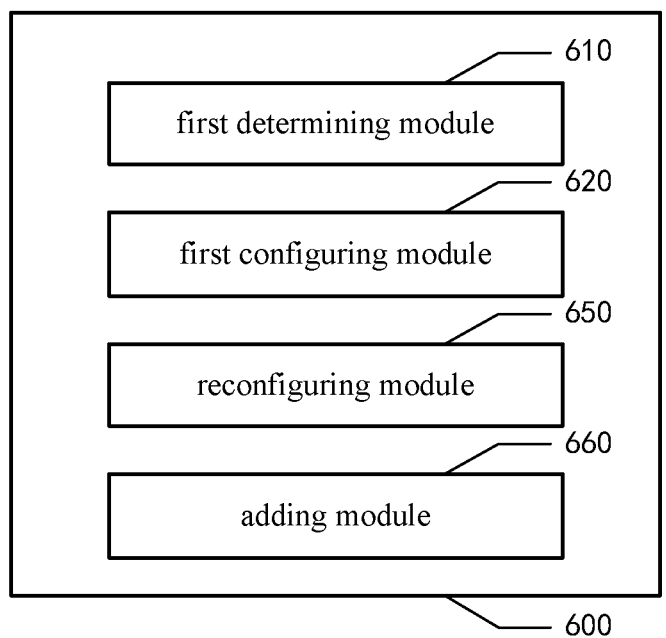
FIG. 7E schematically shows a block diagram of a system of implementing a security algorithm using a reconfigurable processor, in accordance with another embodiment of the present disclosure.

FIG. 7E schematically shows a block diagram of a system of implementing a security algorithm using a reconfigurable processor, in accordance with another embodiment of the present disclosure.

As shown in FIG. 7E, the system 600 of implementing a security algorithm using a reconfigurable processor may further include a reconfiguring module 650 and an adding module 660.

The reconfiguring module 650 is configured to, after configuring the reconfigurable processor, reconfigure in real time a key point of a circuit used to implement the security algorithm in the reconfigurable processor.

The adding module 660 is configured to add randomly a delay circuit into a critical path of the circuit used to implement the security algorithm in the reconfigurable processor.

According to an embodiment of the present disclosure, in the process of implementing the security algorithm, the reconfigurable security blank chip may dynamically reconfigure the key points of the circuit (for example, the circuit corresponding to key operations/functions) in the security algorithm in real time by using its own reconfigurability, and/or randomly add a delay circuit into the critical path of the circuit, to improve the security of the security algorithm implementation process, and enable the security algorithm to effectively defend against side channel attacks.

Figure 8:
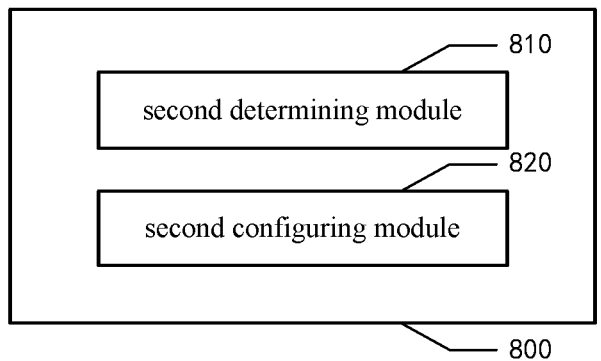
FIG. 8 schematically shows a block diagram of a system of implementing a decryption algorithm using a reconfigurable processor, in accordance with an embodiment of the present disclosure.

FIG. 8 schematically shows a block diagram of a system of implementing a decryption algorithm using a reconfigurable processor, in accordance with an embodiment of the present disclosure.

As shown in FIG. 8, the system 800 of implementing a decryption algorithm using a reconfigurable processor may include a second determining module 810 and a second configuring module 820.

The second determining module 810 is configured to determine a plurality of decryption sub-algorithms for decrypting a security algorithm.

The second configuring module 820 is configured to configure the reconfigurable processor to implement the decryption algorithm according to a second configuration information of each of the plurality of decryption sub-algorithms and a second combination configuration information indicating a combination connection relationship of each decryption sub-algorithms.

According to the embodiment of the present disclosure, the reconfigurable processor is configured according to a second configuration information of each of the plurality of decryption sub-algorithms and a second combination configuration information indicating a combination connection relationship of each decryption sub-algorithms, therefore, the security of the decryption algorithm and the security of the decryption process of the security algorithm can be ensured, and the security risks of the sensitive data management and the risk of the side channel attacks can be prevented.

Figure 9A:
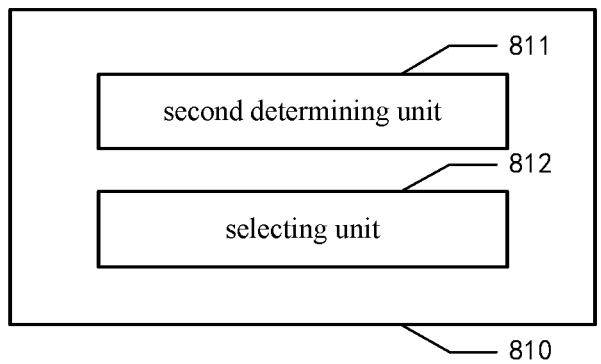
FIG. 9A schematically shows a block diagram of the second determining module in accordance with an embodiment of the present disclosure.
Figure 9B:
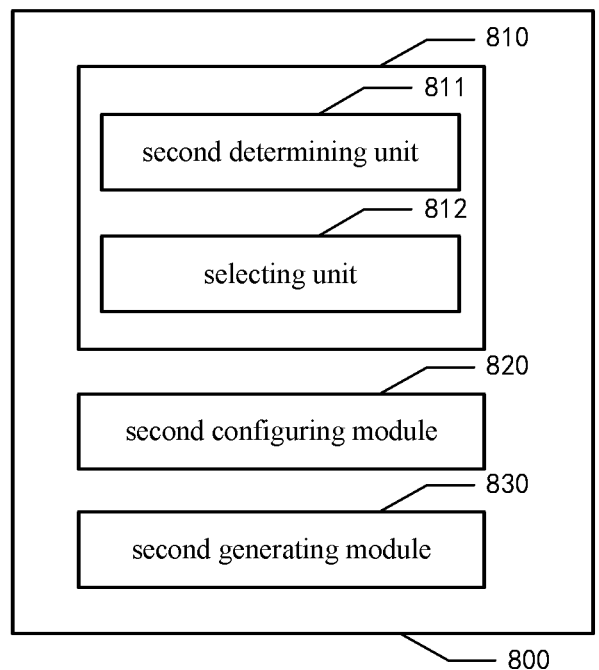
FIG. 9B schematically shows a block diagram of a system of implementing a decryption algorithm using a reconfigurable processor, in accordance with another embodiment of the present disclosure.

With reference to FIG. 9A and FIG. 9B, the system shown in FIG. 8 will be further described combined with specific embodiments.

FIG. 9A schematically shows a block diagram of the second determining module in accordance with an embodiment of the present disclosure.

As shown in FIG. 9A, the second determining module 810 may include a second determining unit 811 and a selecting unit 812.

The second determining unit 811 is configured to determine a plurality of sub-algorithms of the security algorithm according to a header information of a data packet to be decrypted.

The selecting unit 812 is configured to select the plurality of decryption sub-algorithms corresponding to the plurality of index values from a second algorithm library according to the plurality of sub-algorithms of the security algorithm.

According to the embodiment of the present disclosure, when the data is encrypted, the identifiers of the sub-algorithms are generated when the algorithm library is dynamically loaded into the reconfigurable processor. Thus, if the reconfigurable processor performing the decryption is different from the reconfigurable processor performing the encryption, the reconfigurable processor performing the encryption needs to notify the generated identifiers to the reconfigurable processor performing the decryption. In this case, even if any party obtains a complete algorithm library through other non-technical methods, the encryption algorithm or the decryption algorithm cannot be cracked according to the algorithm identifiers in the packet header information, thereby improving the security of the algorithm.

FIG. 9B schematically shows a block diagram of a system of implementing a decryption algorithm using a reconfigurable processor, in accordance with another embodiment of the present disclosure.

As shown in FIG. 9B, the system 800 of implementing a decryption algorithm using a reconfigurable processor may further include a second generating module 830.

The second generating module 830 is configured to, before the reconfigurable processor is configured according to the second configuration information of each of the plurality of decryption sub-algorithms and the second combination configuration information indicating the combination connection relationship of each decryption sub-algorithms, generate the second combination configuration information according to a reverse order of a connection order of the plurality of sub-algorithms in the security algorithm.

Any of a plurality of modules, units, subunits, or at least some of the functions of any of the plurality of modules, units, or sub-units according to embodiments of the present disclosure may be implemented in one module. Any one or more of the modules, units, and subunits according to an embodiment of the present disclosure may be implemented by being split into a plurality of modules. Any one or more of the modules, units, subunits in accordance with embodiments of the present disclosure may be implemented at least in part as hardware circuitry, such as a Field Programmable Gate Array (FPGA), a Programmable Logic Array (PLA), a system on a chip, a system on a substrate, a system on a package, an application specific integrated circuit (ASIC), or may be implemented in any other reasonable manner of hardware or firmware that integrates or packages the circuits, or may be implemented in any of three implementations of software, hardware, and firmware, or in appropriate combinations of any of these. Alternatively, one or more of the modules, units, sub-units in accordance with embodiments of the present disclosure may be implemented at least in part as a computer program module that, when executed, may perform the corresponding functions.

For example, any of the first determining module 610, the first configuring module 620, the first generating module 630, the processing module 640, the reconfiguring module 650, the adding module 660, the computing unit 611, the first determining unit 612, the computing subunit 6111, the processing subunit 6112 and the selection subunit 6113 may be combined and implemented in one module, or any one of the modules may be split into a plurality of modules. Alternatively, at least some of the functionality of one or more of the modules may be combined with at least some of the functionality of the other modules and implemented in one module. Any of the second determining module 810, the second configuring module 820, the second generating module 830, the second determining unit 811, and the selecting unit 812 may be implemented in one module, or any one of the modules may be split into a plurality of modules. Alternatively, at least some of the functionality of one or more of the modules may be combined with at least some of the functionality of the other modules and implemented in one module. According to an embodiment of the present disclosure, at least one of the first determining module 610, the first configuring module 620, the first generating module 630, the processing module 640, the reconfiguring module 650, the adding module 660, the second determining module 810, the second configuring module 820, the second generating module 830, the computing unit 611, the first determining unit 612, the second determining unit 811, the selecting unit 812, the computing subunit 6111, the processing subunit 6112 and the selection subunit 6113 may be at least partially implemented as a hardware circuit such as a field programmable gate array (FPGA), a programmable logic array (PLA), a system-on-chip, a system on substrate, a system on package, an application specific integrated circuit (ASIC), or may be implemented in any other reasonable manner of hardware or firmware that integrates or packages the circuits, or may be implemented in any of three implementations of software, hardware, and firmware, or in appropriate combinations of any of these. Alternatively, at least one of the first determining module 610, the first configuring module 620, the first generating module 630, the processing module 640, the reconfiguring module 650, the adding module 660, the second determining module 810, the second configuring module 820, the second generating module 830, the computing unit 611, the first determining unit 612, the second determining unit 811, the selecting unit 812, the computing subunit 6111, the processing subunit 6112 and the selecting subunit 6113 may be implemented at least in part as a computer program module, and when the computer program is executed, a corresponding function may be performed.

Another aspect of the present disclosure provides a computer system comprising: one or more processors; and a computer readable storage medium for storing one or more programs, wherein, the one or more programs, when executed by the one or more processors, cause the one or more processors to implement the method of implementing the security algorithm using the reconfigurable processor as described by any of the above embodiments, and/or implement the method of implementing the decryption algorithm using the reconfigurable processor as described by any of the above embodiments.

Figure 10:
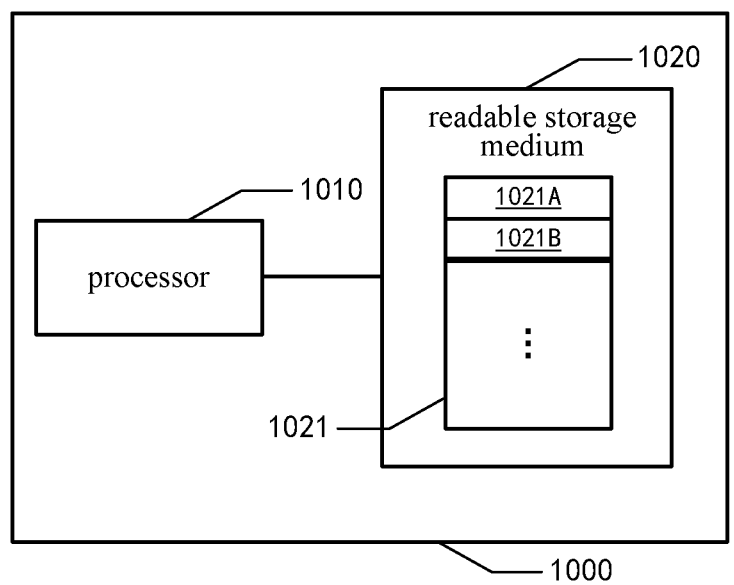
FIG. 10 schematically shows a block diagram of a computer system that may implement the method of implementing a security algorithm using a reconfigurable processor, and/or may implement the method of implementing a decryption algorithm using a reconfigurable processor, in accordance with an embodiment of the present disclosure.

FIG. 10 schematically shows a block diagram of a computer system that may implement the method of implementing a security algorithm using a reconfigurable processor, and/or may implement the method of implementing a decryption algorithm using a reconfigurable processor, in accordance with an embodiment of the present disclosure. The computer system shown in FIG. 10 is merely an example and should not impose any limitation on the function and scope of use of the embodiments of the present disclosure.

As shown in FIG. 10, the computer system 1000 includes a processor 1010 and a computer readable storage medium 1020. The computer system 1000 may perform the method in accordance with the embodiments of the present disclosure.

Specifically, the processor 1010 may include, for example, general purpose microprocessors, instruction set processors and/or associated chipsets and/or special purpose microprocessors (e.g., application specific integrated circuits (ASICs)), and the like. The processor 1010 may also include an on-board memory for cache usage. The processor 1010 may be a single processing unit or a plurality of processing units for performing different actions of the method flow according to the embodiments of the present disclosure.

The computer readable storage medium 1020 may be any medium that may contain, store, communicate, propagate, or transport instructions. For example, readable storage medium may include but are not limited to electrical, magnetic, optical, electromagnetic, infrared, or semiconductor systems, apparatus, devices, or propagation medium. Specific examples of readable storage medium include a magnetic storage device such as a magnetic tape or a hard disk (HDD), an optical storage device such as a compact disc (CD-ROM), a memory such as a random access memory (RAM) or a flash memory, and/or wired/wireless communication link.

The computer readable storage medium 1020 may include a computer program 1021 that may include codes/computer-executable instructions that, when executed by the processor 1010, cause the processor 1010 to perform the method according to the embodiments of the present disclosure and any variations thereof.

Computer program 1021 may be configured with computer program codes, including, for example, computer program modules. For example, in an example embodiment, the codes in the computer program 1021 may include one or more program modules including, for example, a module 1021A, a module 1021B, etc. It should be noted that the division manner and the number of modules are not fixed, and those skilled in the art may use appropriate program modules or combination of program modules according to actual situations. When these program module combinations are executed by the processor 1010, the processor 1010 may perform the method according to the embodiments of the present disclosure or any variations thereof.

According to the embodiment of the present disclosure, at least one of the first determining module 610, the first configuring module 620, the first generating module 630, the processing module 640, the reconfiguring module 650, the adding module 660, the second determining module 810, the second configuring module 820, the second generating module 830, the computing unit 611, the first determining unit 612, the second determining unit 811, the selecting unit 812, the computing subunit 6111, the processing subunit 6112 and the selecting subunit 6113 may be implemented as a computer program module described with reference to FIG. 10, which, when executed by the processor 1010, may implement each operations described above.

Another aspect of the present disclosure provides a computer readable storage medium having executable instructions stored thereon that, when executed by a processor, cause the processor to implement the method of implementing a security algorithm using a reconfigurable processor as described by any of the above embodiments, and/or implement the method of implementing a decryption algorithm using a reconfigurable processor as described by any of the above embodiments. The computer readable medium may be embodied in the apparatus/device/system described in the above embodiments; it may be separately present and not incorporated into the apparatus/device/system. The computer readable medium carries one or more programs that, when executed, implement the following method: determining a plurality of sub-algorithms for constructing the security algorithm; and configuring the reconfigurable processor to implement the security algorithm according to a first configuration information of each sub-algorithm of the plurality of sub-algorithms and a first combination configuration information indicating a combination connection relationship of each sub-algorithms, and/or implement the following method: determining a plurality of decryption sub-algorithms for decrypting a security algorithm; and configuring the reconfigurable processor to implement the decryption algorithm according to a second configuration information of each of the plurality of decryption sub-algorithms and a second combination configuration information indicating a combination connection relationship of each decryption sub-algorithms.

According to an embodiment of the disclosure, the computer readable medium may be a computer readable signal medium or a computer readable storage medium or any combination of the two. The computer readable storage medium may be, for example, but not limited to, an electronic, magnetic, optical, electromagnetic, infrared, or semiconductor system, apparatus, or device, or any combination of the above. More specific examples of computer readable storage medium may include, but are not limited to, electrical connections having one or more wires, portable computer disks, hard disks, random access memory (RAM), read only memory (ROM), erasable programmable read only memory (EPROM or flash memory), optical fiber, portable compact disk read only memory (CD-ROM), optical storage device, magnetic storage device, or any suitable combination of the foregoing. In the present disclosure, a computer readable storage medium may be any tangible medium containing or storing a program that can be used by or in connection with an instruction execution system, apparatus or device. In the present disclosure, a computer readable signal medium may include a data signal that is propagated in a baseband or as part of a carrier, in which computer readable program code is carried. Such propagated data signals may take a variety of forms including, but not limited to, electromagnetic signals, optical signals, or any suitable combination of the foregoing. The computer readable signal medium may also be any computer readable medium other than a computer readable storage medium, which may transmit, propagate, or transport a program for use by or in connection with the instruction execution system, apparatus, or device. Program code embodied on a computer readable medium may be transmitted by any suitable medium, including but not limited to, wireless, wired, optical cable, radio frequency signals, and the like, or any suitable combination of the foregoing.

The flowchart and block diagrams in the figures illustrate the architecture, functionality and operation of possible implementations of systems, methods and computer program products in accordance with various embodiments of the disclosure. At this point, each block in the flowcharts or block diagrams may represent a hardware module, a program segment, or a part of code, and the above-mentioned module, program segment, or part of code may include one or more executable instructions for the implementation of the specified logic function. It should also be noted that in some alternative implementations, the functions annotated in the blocks may also occur in a different order than that annotated in the figures. For example, two consecutively represented blocks may actually be executed substantially in parallel, and they may sometimes be executed in the reverse order, depending on the function involved. It is also to be noted that each block in the block diagrams or the flowcharts, and combinations of blocks in the block diagrams and the flowcharts, may be implemented by a dedicated hardware-based system that performs specified functions or operations, or may be implemented by a combination of dedicated hardware and computer instructions.

A person skilled in the art may understand that, the features described in the various embodiments and/or claims of the present disclosure may be combined or conjunct in various ways even if such combinations or conjunctions are not explicitly described in the present disclosure. In particular, various combinations and/or conjunctions of the features described in the various embodiments and/or claims of the present disclosure may be made without departing from the spirit and scope of the present disclosure. All such combinations and/or conjunctions are within the scope of this disclosure.

Although the present disclosure has been shown and described with reference to specific exemplary embodiments thereof, it will be understood by those skilled in the art that various changes in form and detail may be made without departing from the spirit and scope of the disclosure, as defined by the appended claims and their equivalents. Therefore, the scope of the disclosure should not be limited to the above-described embodiments, but should be determined not only by the appended claims but also by equivalents of the appended claims.

What is claimed is:

1. A method of implementing a security algorithm by using a reconfigurable processor, comprising performing the following steps each time implementing the security algorithm:

selecting in real time a plurality of sub-algorithms for constructing the security algorithm; and configuring the reconfigurable processor to implement the security algorithm according to a first configuration information of each sub-algorithm of the plurality of sub-algorithms and a first combination configuration information indicating a combination connection relationship of each of the sub-algorithms, wherein, the first configuration information includes a configuration information required by the reconfigurable processor to implement each sub-algorithm, and the first combination configuration information includes a configuration information required by the reconfigurable processor to implement the combination connection of the plurality of sub-algorithms, wherein the selecting in real time the plurality of sub-algorithms for constructing the security algorithm comprises computing a plurality of index values according to a dynamically changed signal source, and selecting, from a first algorithm library, the plurality of sub-algorithms whose identifiers match the plurality of index values, respectively, wherein when the first algorithm library is loaded into the reconfigurable processor, a feature parameter of the reconfigurable processor is used to generate the identifiers for uniquely representing each of the sub-algorithms in the first algorithm library.

2. The method according to claim 1, wherein, the computing the plurality of index values according to the dynamically changed signal source comprises:

computing the plurality of index values according to the feature parameter and a scene parameter of the reconfigurable processor, wherein, the feature parameter includes hardware feature parameter, and the scene parameter includes system time or ambient temperature.

3. The method according to claim 2, wherein, the first algorithm library includes the first configuration information of N sub-algorithms, where N is greater than a number of sub-algorithms selected this time.

4. The method according to claim 3, wherein, the computing the plurality of index values according to the feature parameter and the scene parameter of the reconfigurable processor comprises:

computing each of the plurality of index values as follows:

computing a first numerical value according to a first preset algorithm based on the feature parameter and the scene parameter; and dividing the first numerical value by a total number N of the sub-algorithms in the first algorithm library to obtain a corresponding remainder, and using the remainder as an index value.

5. The method according to claim 2, wherein, the computing the plurality of index values according to the feature parameter and the scene parameter of the reconfigurable processor comprises:

computing a second numerical value according to a second preset algorithm based on the feature parameter and the scene parameter;

using the second numerical value as a seed of a random number generator to obtain a random numerical string; and selecting the plurality of index values from the random numerical string.

6. The method according to claim 1, wherein, when configuring the reconfigurable processor, the plurality of sub-algorithms are connected in an order indicated in the first combination configuration information, and two sub-algorithms connected to each other are not related.

7. The method according to claim 1, wherein, after configuring the reconfigurable processor, the method further comprises:

(1) reconfiguring in real time a key point of a circuit used to implement the security algorithm in the reconfigurable processor; or (2) adding randomly a delay circuit into a critical path of the circuit used to implement the security algorithm in the reconfigurable processor; or (3) both (1) and (2).

8. A method of implementing a decryption algorithm by using a reconfigurable processor, comprising:

determining a plurality of decryption sub-algorithms for decrypting a security algorithm; and configuring the reconfigurable processor to implement the decryption algorithm according to a second configuration information of each of the plurality of decryption sub-algorithms and a second combination configuration information indicating a combination connection relationship of each of the decryption sub-algorithms, wherein, the second configuration information includes a configuration information required by the reconfigurable processor to implement each decryption sub-algorithm, and the second combination configuration information includes a configuration information required by the reconfigurable processor to implement the combination connection of the plurality of decryption sub-algorithms, wherein the determining the plurality of decryption sub-algorithms for decrypting the security algorithm comprises determining a plurality of sub-algorithms of the security algorithm according to a header information of a data packet to be decrypted; and selecting the plurality of decryption sub-algorithms corresponding to the plurality of sub-algorithms of the security algorithm from a second algorithm library according to identifiers of the plurality of sub-algorithms of the security algorithm and identifiers of sub-algorithms in the second algorithm library, wherein the identifiers of the sub-algorithms in the second algorithm library are notified by a reconfigurable processor that has encrypted the data packet to be decrypted.

9. The method according to claim 8, wherein, before the configuring the reconfigurable processor according to the second configuration information of each of the plurality of decryption sub-algorithms and the second combination configuration information indicating the combination connection relationship of each of the decryption sub-algorithms, the method further comprises:

generating the second combination configuration information according to a reverse order of a connection order of the plurality of sub-algorithms in the security algorithm.

10. A non-transitory computer readable storage medium having executable instructions stored thereon that, when executed by a processor, cause the processor to (1) implement a first method of implementing a security algorithm by using a reconfigurable processor, comprising performing the following steps each time implementing the security algorithm:

selecting in real time a plurality of sub-algorithms for constructing the security algorithm, and configuring the reconfigurable processor to implement the security algorithm according to a first configuration information of each sub-algorithm of the plurality of sub-algorithms and a first combination configuration information indicating a combination connection relationship of each of the sub-algorithms, wherein, the first configuration information includes a configuration information required by the reconfigurable processor to implement each sub-algorithm, and the first combination configuration information includes a configuration information required by the reconfigurable processor to implement the combination connection of the plurality of sub-algorithms, wherein the selecting in real time the plurality of sub-algorithms for constructing the security algorithm comprises computing a plurality of index values according to a dynamically changed signal source, and selecting, from a first algorithm library the plurality of sub-algorithms whose identifiers match the plurality of index values, respectively, wherein when the first algorithm library is loaded into the reconfigurable processor, a feature parameter of the reconfigurable processor is used to generate the identifiers for uniquely representing each of the sub-algorithms in the first algorithm library; or (2) implement a second method of implementing a decryption algorithm by using a reconfigurable processor, comprising:

determining a plurality of decryption sub-algorithms for decrypting the security algorithm, and configuring the reconfigurable processor to implement the decryption algorithm according to a second configuration information of each of the plurality of decryption sub-algorithms and a second combination configuration information indicating a combination connection relationship of each of the decryption sub-algorithms, wherein, the second configuration information includes a configuration information required by the reconfigurable processor to implement each decryption sub-algorithm, and the second combination configuration information includes a configuration information required by the reconfigurable processor to implement the combination connection of the plurality of decryption sub-algorithms, wherein the determining the plurality of decryption sub-algorithms for decrypting the security algorithm comprises determining identifiers of a plurality of sub-algorithms of the security algorithm according to a header information of a data packet to be decrypted, and selecting the plurality of decryption sub-algorithms corresponding to the plurality of sub-algorithms of the security algorithm from a second algorithm library according to the determined identifiers of the plurality of sub-algorithms of the security algorithm and identifiers of sub-algorithms in the second algorithm library, wherein the identifiers of the sub-algorithms in the second algorithm library are notified by a reconfigurable processor that has encrypted the data packet to be decrypted; or (3) implement a method comprising the first method and the second method.

* * * * *